US008127917B2

(12) United States Patent
Enenkel

(10) Patent No.: US 8,127,917 B2
(45) Date of Patent: Mar. 6, 2012

(54) PILE TRANSFER DEVICE AND METHOD

(75) Inventor: Peter Enenkel, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 249 days.

(21) Appl. No.: 11/886,614

(22) PCT Filed: Mar. 21, 2006

(86) PCT No.: PCT/IB2006/000960

§ 371 (c)(1),
(2), (4) Date: Sep. 18, 2007

(87) PCT Pub. No.: WO2006/100604

PCT Pub. Date: Sep. 28, 2006

(65) Prior Publication Data

US 2009/0060698 A1 Mar. 5, 2009

Related U.S. Application Data

(60) Provisional application No. 60/663,247, filed on Mar. 21, 2005.

(51) Int. Cl.
*B65G 37/00* (2006.01)

(52) U.S. Cl. ..................... 198/809; 198/370.1; 198/506; 198/508

(58) Field of Classification Search .................. 198/809, 198/801, 370.1, 506, 508
See application file for complete search history.

(56) References Cited

U.S. PATENT DOCUMENTS

| | | | | |
|---|---|---|---|---|
| 3,573,748 | A | 4/1971 | Holme | |
| 4,273,234 | A * | 6/1981 | Bourgeois | 198/347.3 |
| 4,593,896 | A | 6/1986 | Nakamura | |
| 4,736,936 | A | 4/1988 | Hertel et al. | |
| 5,358,229 | A | 10/1994 | Groel et al. | |
| 5,462,268 | A | 10/1995 | Remy et al. | |
| 5,810,158 | A * | 9/1998 | Schiesser et al. | 198/809 |
| 5,931,634 | A | 8/1999 | Neri | |
| 5,994,657 | A | 11/1999 | Maier et al. | |
| 6,719,126 | B2 * | 4/2004 | Badier et al. | 198/809 |
| 6,845,860 | B1 * | 1/2005 | Walker | 198/433 |

(Continued)

FOREIGN PATENT DOCUMENTS

DE 4000603 C2 4/1998

(Continued)

OTHER PUBLICATIONS

Derwent Abstract—EP 0 479 067 Al; Apr. 8, 1992; MAN Roland Druckmaschinen AG; D-6050 Offenbach/Main, Germany.

(Continued)

*Primary Examiner* — Mark A Deuble

(74) *Attorney, Agent, or Firm* — Laurence A. Greenberg; Werner H. Stemer; Ralph E. Locher

(57) ABSTRACT

In a mail processing system, a support element has a flat floor with elements spaced from each other so that a comb-type or fork-type structure is produced, wherein the elements have front section extending upwards. A first transport device has a number of bands equipped with sectional separators, which are spaced from one another. To transfer piled postal items from the support element to the first transport device the floor is aligned with the transport device, and the floor and the transport device are interlocked, so that at least a part of one of the bands extends between the elements.

5 Claims, 20 Drawing Sheets

U.S. PATENT DOCUMENTS

| | | | | |
|---|---|---|---|---|
| 6,907,978 | B2 * | 6/2005 | Evans et al. | 198/370.09 |
| 7,343,219 | B2 | 3/2008 | Berdelle-Hilge | |
| 7,397,010 | B2 | 7/2008 | Wilke | |
| 7,397,011 | B2 | 7/2008 | Berdelle-Hilge | |
| 2003/0021668 | A1 | 1/2003 | Michler et al. | |
| 2004/0153208 | A1 | 8/2004 | Wilke | |
| 2005/0056572 | A1 | 3/2005 | Wilke | |
| 2006/0102529 | A1 | 5/2006 | Wilke | |
| 2007/0022719 | A1 | 2/2007 | Berdelle-Hilge | |
| 2007/0027574 | A1 | 2/2007 | Berdelle-Hilge et al. | |

FOREIGN PATENT DOCUMENTS

| | | | |
|---|---|---|---|
| DE | 199 43 362 | A1 | 3/2001 |
| EP | 0 274 896 | | 7/1988 |
| EP | 0 479 067 | A1 | 4/1992 |
| EP | 0 885 827 | A1 | 12/1998 |
| EP | 1220721 | B1 | 12/2004 |
| WO | 2004067193 | A1 | 8/2004 |
| WO | 2004071680 | A1 | 8/2004 |
| WO | 2005025764 | A1 | 3/2005 |
| WO | 2005025765 | A1 | 3/2005 |

OTHER PUBLICATIONS

Derwent Abstract—DE 199 43 362 A1; Mar. 22, 2001; Siemens AG, D-80333 München, Germany.

* cited by examiner

PILE TRANSFER DEVICE AND METHOD

CROSS-REFERENCE TO RELATED APPLICATIONS

The present application is a national phase application of international application no. PCT/IB2006/000960, filed on Mar. 21, 2006, which claims priority to U.S. provisional application no. 60/663,247, filed on Mar. 21, 2005, both of which are hereby incorporated by reference.

BACKGROUND OF THE INVENTION

The invention relates in general to a system for processing postal items, especially to a device for sorting flat postal items according to a definable sequence of delivery points assigned to recipient addresses.

Postal distribution centers sort millions of postal items each day in order to prepare them for delivery to individual recipient addresses. The term "postal item" includes letters, magazines and newspapers, deliveries of books and other flat items. Before a mailman begins the delivery for example a postal processing system sorts the postal items in a postal distribution center. One of the mailman's tasks is to sort the mail items in the order in which they will be delivered, in order to achieve an efficient delivery.

A postal processing system is highly automated in order to deal with the number of postal items to be delivered each day. The postal processing system can contain a system which processes the postal items and packs them in accordance with delivery points and puts this volume into a delivery round sequence (also referred to as a DPP system, with DPP standing for Delivery Point Packaging). As well as other functions, processing includes separating the postal items, reading their receive addresses, grouping and delivery round sorting in accordance with their recipient addresses. Such postal processing systems are designed to generally operate efficiently and reliably, but to avoid imposing disproportionate stress on the postal items when doing so, so that postal items are not damaged are only slightly damaged.

There is a known solution (EP 820 818 910 A1) for sorting postal items into a specific order which employs intermediate storage consisting of pockets or similar elements each of which accommodates one item and can output this on a control command into the actual output bin. In this case all postal items to be sorted are accommodated in a random order in the pockets of the intermediate store. Then the postal items are taken out of the pockets of the intermediate store and transferred into the bins so that they are in their order of delivery in the latter. A separate bin is provided for each postal item. The sorting is undertaken with two passes of the intermediate store pockets, one pass for filling the pockets, a further pass for emptying the pockets.

However this requires a large number of bins, with each having to be equipped with a control mechanism, which brings about the transfer of the postal item from the correct pocket of the intermediate store.

Also known was a corresponding solution in which a number of postal items can be sorted into the bins in each case. The items are output from the containers into the bins in a number of passes, with the order of the postal items in each bin corresponding to the sequence of addresses of the delivery points assigned to postal items in the respective bin (DE 199 43 362 AI).

A device is known from U.S. Pat. No. 3,573,748 in which postal items are emptied from fixed pockets onto an output conveyor device subdivided into sections, and a device is known from U.S. Pat. No. 5,462,268 A in which the postal items are emptied from circulating pockets into containers and thus into sections of a conveyor.

A process description is known from WO 2005/025763 A1 for delivery round sorting with a sorting system with intermediate storage. In this case a volume of postal items which can be greater than the storage capacity of the intermediate store is efficiently processed.

SUMMARY OF THE INVENTION

The object of the invention is to create a device for sorting flat postal items according to a definable sequence of the delivery points assigned to the recipient addresses, in which the postal items are sorted efficiently and with increased throughput. This is undertaken by the postal items only being separated and read once and brought by means of circulating intermediate stores in the defined sequence, with the effort for removing the postal items being reduced and other postal items or streams of postal items able to be additionally inserted.

In accordance with one exemplary embodiment, below a contiguous part of the intermediate store referred to as a covering area is located an output conveyor device moving at a relative speed to the former to accept the postal items from the intermediate store for onwards transport of the postal items to a piling device. The transport speed of the output conveyor device is matched to the transport speed of the intermediate store in such a way that each section of the output conveyor device during its movement along the covering area has passed each storage location at least once, and with the postal items being emptied from the storage locations of the intermediate store corresponding to the read recipient addresses onto the output conveyor device such that they leave the output conveyor device into the piling device in the defined sequence of delivery addresses. To this end the device has at least one output.

So that the postal items lie safely on each other or next to each other, it is advantageous to divide the output conveyor device for example into sections with bars, to use a sectional conveyor or individual supports (tablets, trays) for this purpose.

To enable non-constant input streams of postal items without deterioration in the sorting performance as well as separation streams with constant gaps between the postal items to be processed, a buffer storage device is advantageously arranged between the read device or devices and the intermediate store for accepting the read postal items. The read postal items are each able to be loaded in the loading station for the buffer store into the buffer pockets, which output the postal items in at least one output in a controlled manner to empty storage locations of the sorting intermediate store and which in a further advantageous embodiment are able to be coupled to a surrounding endless conveyor means and are able to be decoupled from this means. On transfer the buffer pockets of the buffer device are coupled to the conveyor means and the transferring buffer store runs positioned in the same direction at the same speed to the storage location to be loaded.

It is also advantageous for the intermediate store and the output conveyor device to circulate in different directions so that the speed of the output conveyor device can be kept relatively low.

To merge the postal items from the intermediate store with further postal items/streams of postal items, equipment for loading with further postal items to be distributed to the respective recipient addresses is advantageously arranged on the sections assigned to the recipient addresses above the parts of the output conveyor device lying outside the coverage area.

To ensure that the postal items are only directed onto the output part up to a maximum intended height, sensors for measuring the thicknesses of the postal items are provided. If the total height of the postal items assigned to a delivery point exceeds a limit value the adjoining areas can also be loaded if required with postal items of the same delivery point.

For optimum utilization of the output conveyor device, a number of postal items of different but adjoining delivery points can also be loaded into one section of the output conveyor device.

In this case the volumes of postal items must lie above each other in the defined sequence of delivery points in the sections of the output conveyor device.

So that the covered area is as large as possible in relation to the footprint, it is advantageous to arrange the output conveyor device under a part of the intermediate store in a U-shape.

It is also advantageous for the intermediate store and/or the buffer store to have at least one loading or unloading station outside the coverage area for additional removal of postal items from the storage points in accordance with specific sorting criteria. This makes it possible, in addition to sorting, also to separate postal items according to specific criteria.

To keep the footprint of the device a small as possible it is advantageous to route the part of the intermediate store extending beyond the coverage area and not located below the unloading station of the buffer store into an additional level which is located above the level of the buffer store or below the level of the output conveyor device, with the postal items being able to circulate at both levels in the same direction.

In this case it is especially advantageous for the height-surmounting diversion of the intermediate store to be undertaken within the buffer store.

In addition to a first device, a second device for sorting is provided which is rotated in relation to the first device by 180 degrees around the vertical axis with which the part of the intermediate store not located above the output conveyor device is located in the other level opposite the corresponding part of the first device for ordering. Thus the two devices can be inserted nested into one another by which the footprint required is almost halved in relation to a separate setup.

To save the mailperson manual labor it is advantageous to provide a device for positioning between output conveyor device and piling device in which the contiguous postal items are packaged for a delivery point into bags or plastic sleeves in each case before being piled or are provided with banderoles or with small flags.

BRIEF DESCRIPTION OF THE SEVERAL VIEWS OF THE DRAWINGS

The invention will be explained below in greater detail in an exemplary embodiment with reference to the drawing. The figures show.

DETAILED DESCRIPTION OF THE INVENTION

Figure 1:
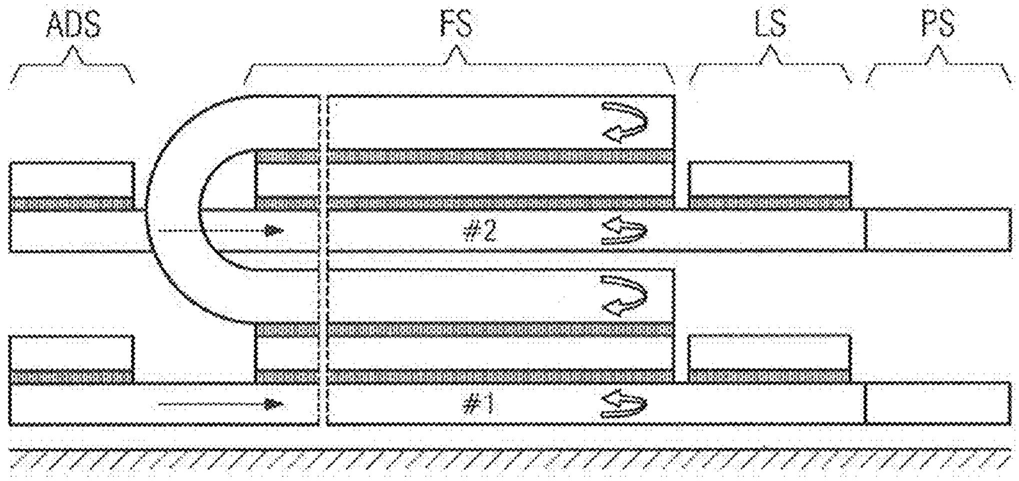
FIG. 1 a schematic overview of a system for sorting postal items.
Figure 2:
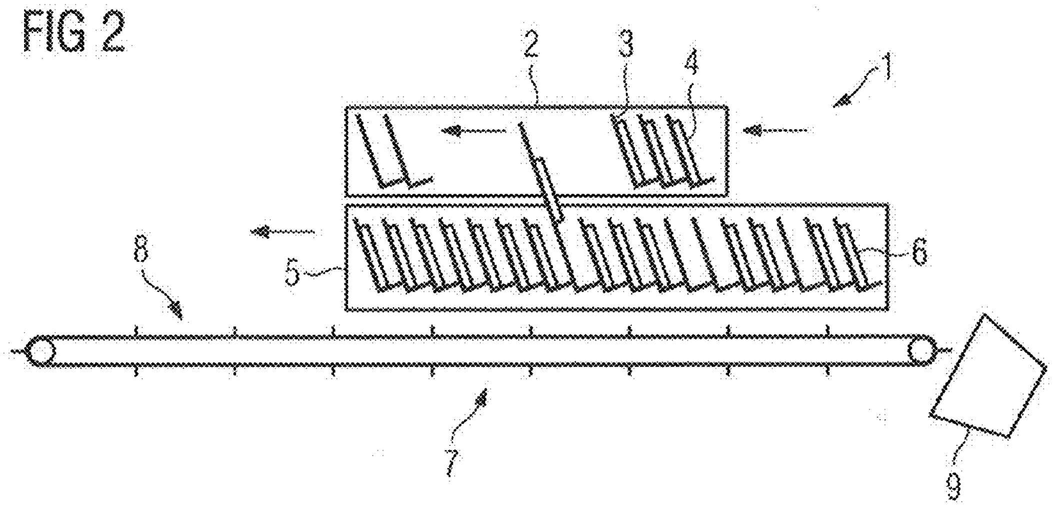
FIG. 2 a schematic side view of a device for ordering according to the distribution sequence with loading of the intermediate store, FIG. 3 a schematic side view of a device for loading the output conveyor device subdivided into sections, FIG. 4 a schematic overhead view of a device for putting items into order, FIG. 5 a schematic diagram of the functional principle with reference to the schematic overhead view, FIG. 6 a perspective diagram of a device for putting items into order with a number of levels, FIG. 7 a perspective view of two ordering devices nested within one another, FIG. 8 a schematic diagram of an exemplary embodiment of a device for ordering with two outputs, FIG. 9 a schematic diagram of an exemplary embodiment of a device for ordering with a reduced-length transition of an intermediate store from one level to another, FIG. 10 a schematic diagram of a further exemplary embodiment of a device for ordering with a reduced-length transition of an intermediate store from one level to another, FIG. 11*a*-FIG. 11*c* schematic overhead views of different exemplary embodiments with a reduced-length transition, FIG. 12*a*-FIG. 12*c* an exemplary embodiment of an implementation of the arrangements shown in FIG. 10 in a sorting system, FIG. 13*a*-FIG. 13*e* a schematic diagram of the use of two sets of letter containers, FIG. 14 and FIG. 15 a schematic exemplary embodiment of a letter container, FIG. 16 a schematic diagram of an exemplary embodiment of a device for ordering with two sorting devices, FIG. 17 a more detailed diagram of the device from FIG. 16, FIG. 18 a schematic diagram of an exemplary embodiment of a device for ordering with processing of unaddressed postal items, and FIG. 19-FIG. 22 schematic exemplary embodiments of a comb-type removal device.
Figure 3:
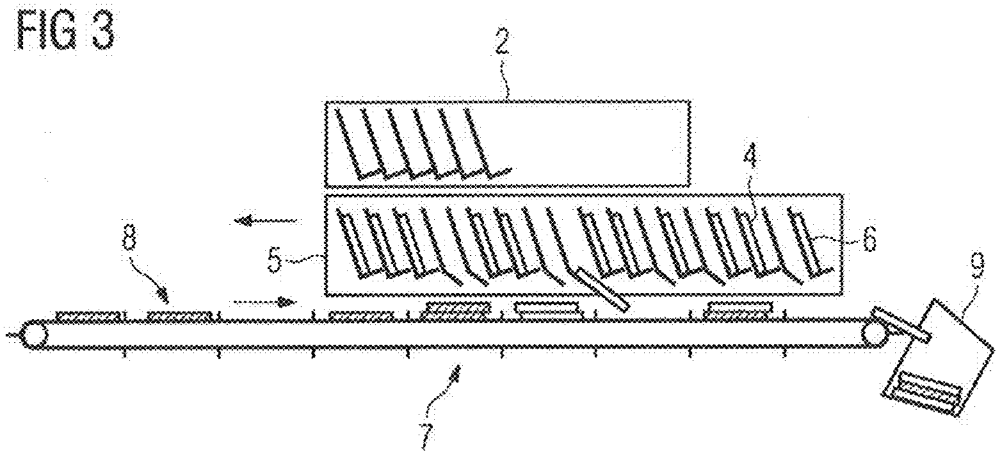

FIG. 1 shows a schematic overview of an exemplary embodiment of the system for sorting postal items. The overview presents the basic sequences and the functional interrelationships within the system. These sequences and interrelationships are shown in FIG. 1 by functional blocks for processing unaddressed postal items ADS, flat item sorting (Flats) FS, letter sorting LS and package sorting PS. These functional blocks represent a few of the main functions of the system. A person skilled in the art in the field of postal sorting systems recognizes however that the system can contain further functional blocks, for example for reading and detection of address fields. In addition it is true that the division into these functional blocks is used here to simplify the description and that the functions can be divided up differently in a concrete embodiment or that functions can be divided up. A more detailed description of a number of exemplary embodiments and their structural components follows.

The functional block for sorting unaddressed postal items ADS for example sorts advertising items which are delivered by different large customers directly to the postal distribution center. The advertising items of a large customer can for example be delivered on pallets. The functional block ADS sorts the promotional items into batches with each batch to be sorted containing the promotional items of different large customers. At the end of the processing a plurality of an promotional items of large customer A and a plurality of commercial items of large customer B are separated for each postal round for example and have been inserted in accordance with the recipient addresses into the further sorting process.

The functional block for flat item sorting FS sorts large flat letters in accordance with the sequence of their delivery. This includes reading of the recipient addresses, loading the flat items into an ordering device and the actual sorting process. At the end of the processing the large flats have been sorted for each mailperson in the round sequence in accordance with their recipient addresses and merged with the unaddressed postal items for each delivery point.

The letter sorting LS sorts smaller letters likewise according to the sequence of their delivery. Also included as part of this processing are the reading of the recipient addresses or of an identification code applied in previous processing processes, the loading into a device for ordering and the actual sorting process. At the end of the processing the letters are put into the round order for each mailperson in accordance with their recipient address and merged together with the unaddressed postal items as well as with the large flat mail items for each delivery point.

The package sorting PS function block packages the assorted postal items per delivery point, for example with a plastic film sleeve. Each volume of postal items of a delivery point sorted in this way is distributed to the respective mailperson in the delivery round sequence of their delivery route.

The sorting of each type of delivery item imposes different demands on the system, in respect of throughput for example. Characteristic of the system illustrated in FIG. 1 is that it can be used of sorting different types of postal items. In such cases the system allows, depending on its embodiment, these postal items to be sorted separately, then to be merged for each delivery point and to be packaged.

The flat item sorting FS functional block is described in greater detail in FIG. 2-FIG. 8. As shown in the exemplary embodiment of FIG. 2, the postal items 4 are first separated in the known manner from a pile in a separation device 1. Then, in a read device not shown in the diagram, the recipient addresses of the postal items 4 are detected and determined. The read postal items 4 are subsequently directed to a buffer storage device 2. There each postal item 4 is conveyed via a loading station into a circulating buffer pocket 3 for example, with these buffer pockets 3 advantageously able to be coupled in a controlled manner after loading to a circulating conveyor device and able to be uncoupled in a controlled manner from the conveyor device and the transfer to the intermediate store able to take place in the uncoupled state.

If a number of separation devices 1 are provided for reasons of throughput, the postal items 4 are transported from each separation device 1 via a separate loading station 1 into the buffer pockets 3.

The buffering capability allows both a non-constant input stream from the separation devices 1 and also an output stream which is not synchronous to the input stream and/or not constant to be further processed. In addition the processing of a separation streams with a constant gap between the postal items is possible. The buffer pockets 3 can be opened downwards in a controlled manner, in order to output the postal items 4 to empty storage locations, for example pockets 6 of a further intermediate store circulating below. In this case the pockets 6 have a fixed connection to the circulating conveyor device.

The intermediate store 5 has a plurality of storage locations into which the postal items 4 can be transferred. The storage locations can be embodied as pockets 6, sorting bins or other support elements of this type. The storage locations are referred to below as pockets 6 without restricting the area of protection. The storage locations can be loaded and unloaded. The intermediate store and the buffer pockets 3 circulate in the same direction.

The postal items 4 are ordered in the agreed sequence to the delivery points by the postal items 4 falling in a controlled manner through the bottom of the pockets 6 downwards on an output conveyor device 7 circulating in the opposite direction to the intermediate store 5 with its upper tower divided into at least logical sections.

In this case the output conveyor device 7 is arranged in a plan view in a V shape below the intermediate store, i.e. the intermediate store 5 is longer than the output conveyor device 7.

The transport speeds are matched to each other such that each section 8 of the output conveyor device 7 during its movement along the covering area with the intermediate store 5 has passed each pocket 6 of the intermediate store 5 once. A number of postal items 4 can be loaded in a section 8 up to a maximum total height, at which a safe transport and a safe piling behavior (s. h.) is guaranteed.

The output conveyor device 7 can also be preloaded with postal items from further sorting or input devices for all or for specific recipients.

At the end of the output conveyor device 7 is a piling device for accepting the piled postal items 4 in the defined sequence into containers 9. Between output conveyor device 7 and piling device there can also be arranged a device for portioning, in which the associated postal items of a delivery point are backed into bags or plastic sleeves before being piled or provided with banderoles or small flags. In accordance with the position of the container 9 the postal items 4 can be piled into the holder 9 in a vertical or a horizontal position. The postal items 4 are loaded onto the output conveyor device 7 so that they leave it in a corresponding sequence. If postal items 4 of different but adjacent delivery points are loaded into a section 8, they must lie above each other in a defined sequence of the delivery points, but can then no longer be packaged for each delivery point.

A simple example is presented to explain the sequence in FIG. 5.

The postal items 4 located in the intermediate store 5 (FIG. 5*a*) are to be deposited in a container in the following order from top to bottom: blue, red, green, purple, in accordance with FIG. 5*g*. Intermediate store 5 and output conveyor device 7 are moving in opposite directions to each other.

Figures 5A, 5B, 5C, 5D, 5E, 5F, 5G:
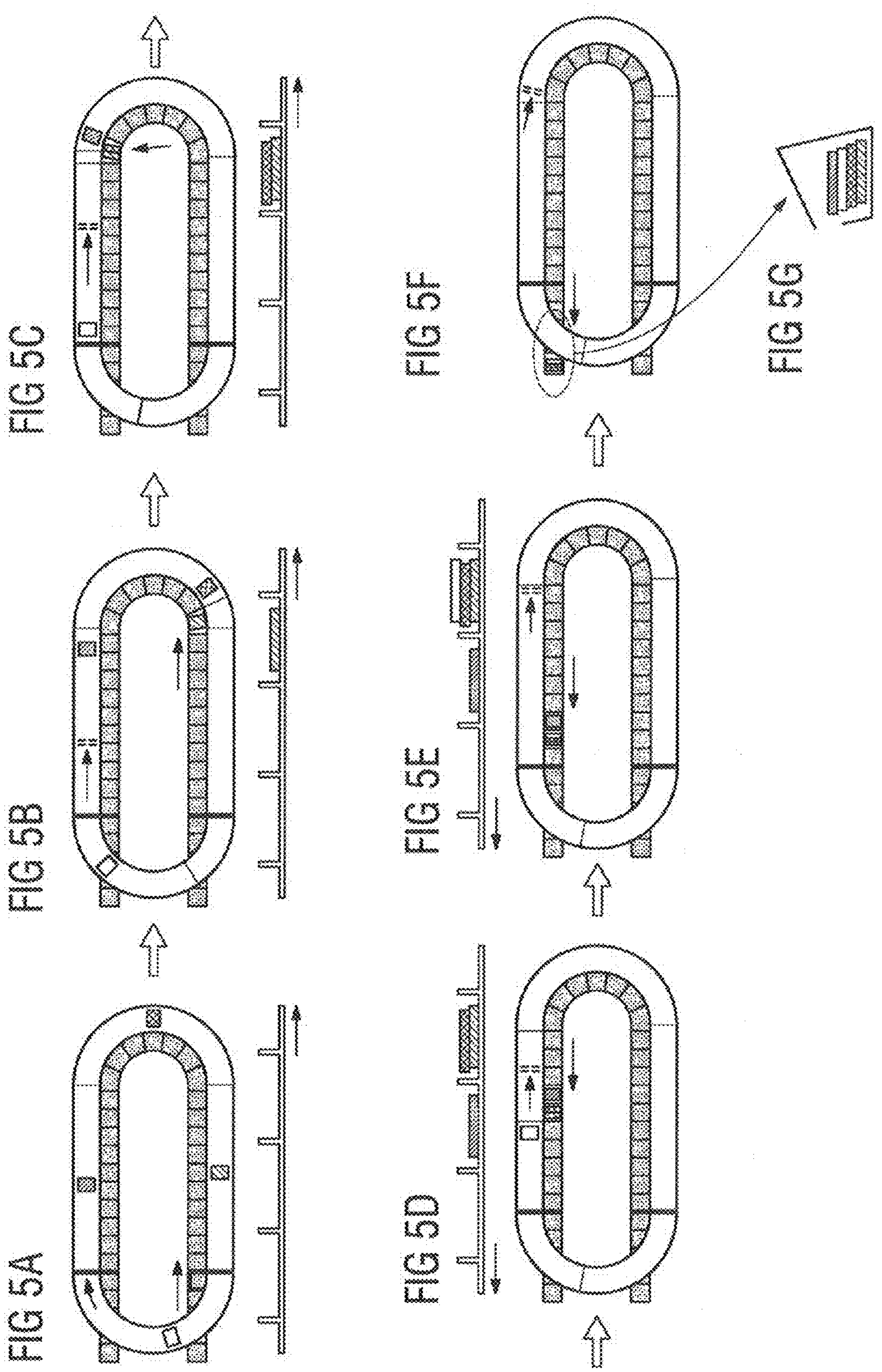

First of all the purple postal item is deposited into a section of the output conveyor device 7 (FIG. 5*b*). If the green postal item 4 is then located over this section, it will be deposited on the purple postal item (FIG. 5*c*) and the blue mail item 4 runs past this section, since the last postal item is in sequence, and is unloaded into the subsequent section (FIG. 5*d*).

In FIG. 5*e* the red postal item has reached the section with the two postal items purple, green and is unloaded as the topmost postal item. This is done under the condition that the previously measured postal item thicknesses allow the three postal items to be stored on one section. Subsequently the postal items 4 are piled in the desired sequence in the piling device in a container (FIG. 5*f*).

To accommodate the ordering device in the smallest possible area, the intermediate store 5 can pass through two levels.

The part of the intermediate store 5 not covering the output conveyor device 7 is able to be folded around a horizontal axis above or below the covering part: The intermediate store 5 the basically is in the shape of a figure of eight lying on its side, which is folded in its node and is surrounded by the buffer storage device 2 there. The actuators for opening the pockets 6 of the intermediate store 5 can be arranged in fixed locations with constant synchronization between intermediate store 5 and output conveyor device 7. A folding can also be performed horizontally.

Figure 6:
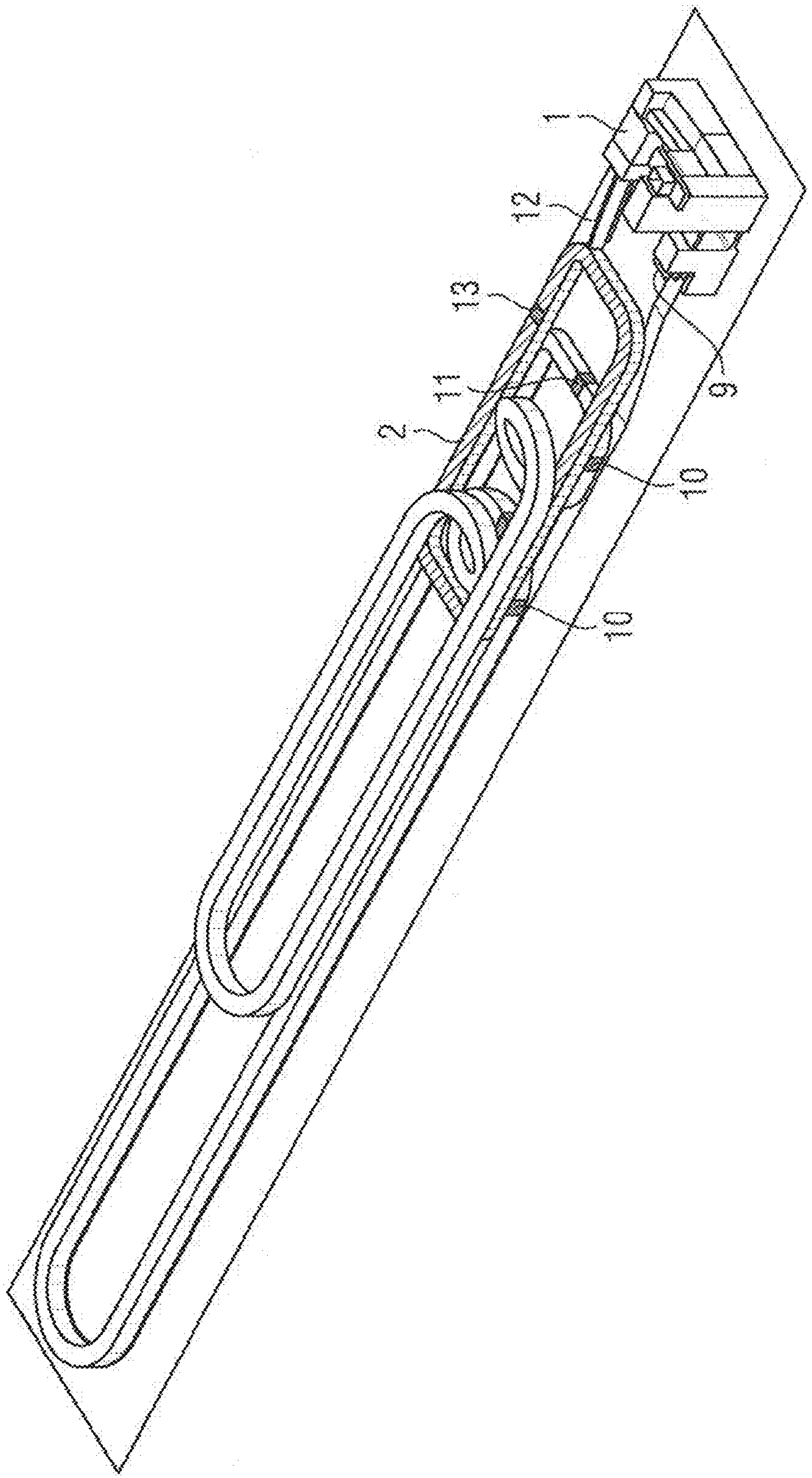

To keep the system as compact as possible, in accordance with FIG. 6 a 540°rerouting via the internal area of the system takes place at the level transition. The figure shows outputs 10 of the buffer storage device 2 outside the coverage area for loading the pockets 6, unloading stations 11 for additional removal of postal items 4 from the pockets 6 according to specific sorting criteria, a loading station 12 for loading the buffer pockets with the postal items from the separation device 1 as well as an output 13 of the buffer storage device 2 for removal of separated postal items.

Figure 7:
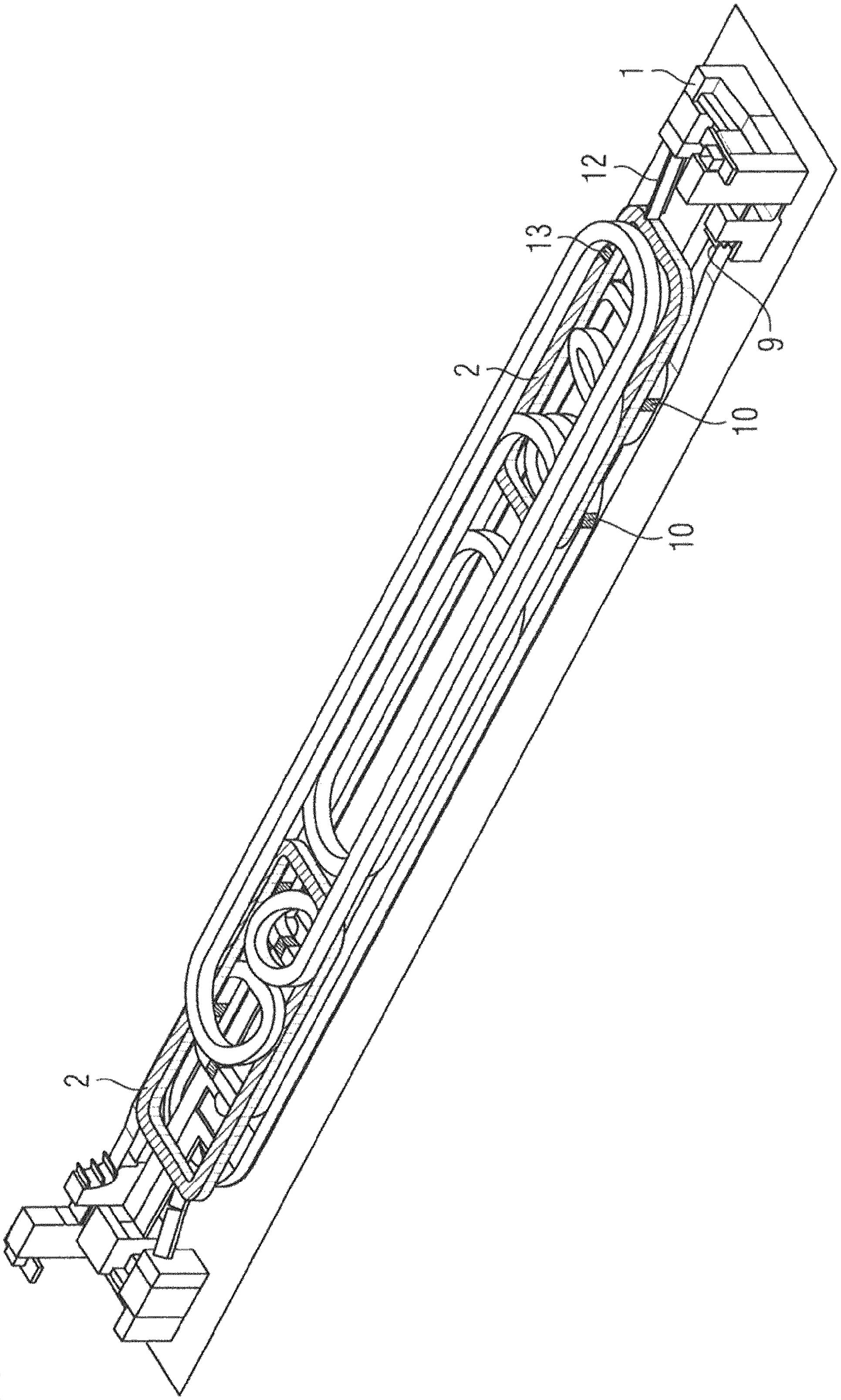

If a second individual system B for sorting is rotated by 180° around its vertical axis and its part of the intermediate store 5 not covering the output conveyor device 7 folded in the opposite manner, the two systems A and B, as shown in FIG. 7 can be inserted into each other, with in one system the additional level of the intermediate store 5 being located above the level of the buffer storage device 2 and in the other system being located below the level of the buffer storage device 2. In this way only a small footprint is required.

Figure 8:
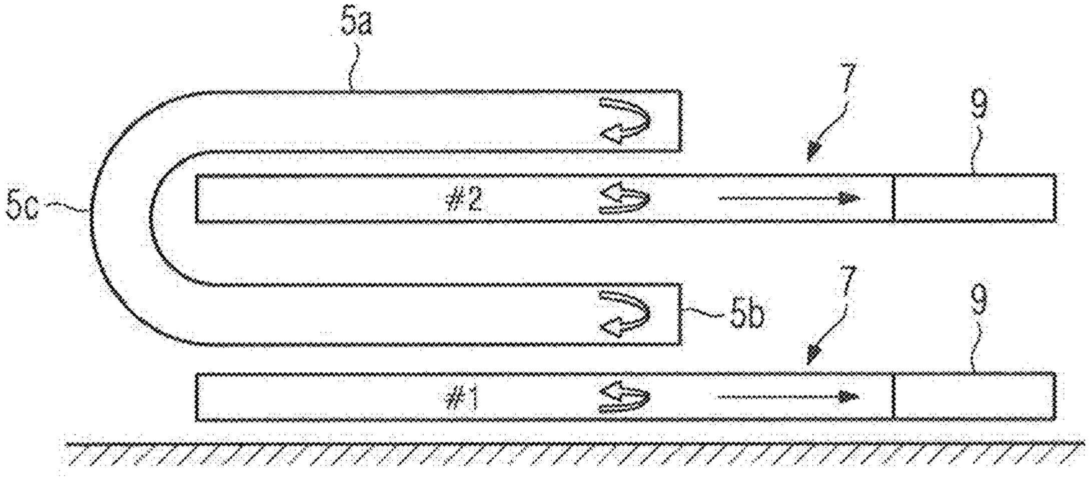

FIG. 8 shows a schematic diagram of a further exemplary embodiment, which offers an increased throughput, but in doing so still needs a minimum footprint. The exemplary embodiment has more than one output conveyor device 7 and thus more than one output. An output conveyor device 7 can as be embodied as a transport path or as a closed transport loop with individual sections 8 (sectional conveyor) or as a plurality of jointly transported support elements (tablets, trays). At its end (or output) each output conveyor device 7 is for example linked to a container 9. A device for portioning can also be arranged in this embodiment between output conveyor device 7 and piling device, in which the associated postal items of a delivery point are packaged before delivery into bags or plastic sleeves or provided with banderoles or small flags. In the exemplary embodiment shown the throughput is increased in proportion to the number of the output conveyor devices 7, for example is doubled in the embodiment shown here.

In the exemplary embodiment of the device shown in FIG. 8 the intermediate store 5 serves two output conveyor devices 7. As can be seen from the side view shown, the output conveyor devices 7 are arranged one above the other on two levels, with the upper level labeled #2 and the lower level #1 in FIG. 8. The intermediate store 5 has an upper part 5*a*, which extends over a part of the upper output conveyor device 7, and a lower part which extends over a part of the lower output conveyor device 7. A joining section 5*c* joins the upper and lower output conveyor devices 7. At the end of each output conveyor device 7, i.e. each level as well, is located a piling device for accommodating the postal items 4 in the defined sequence in holder 9, as already described above.

Figure 9:
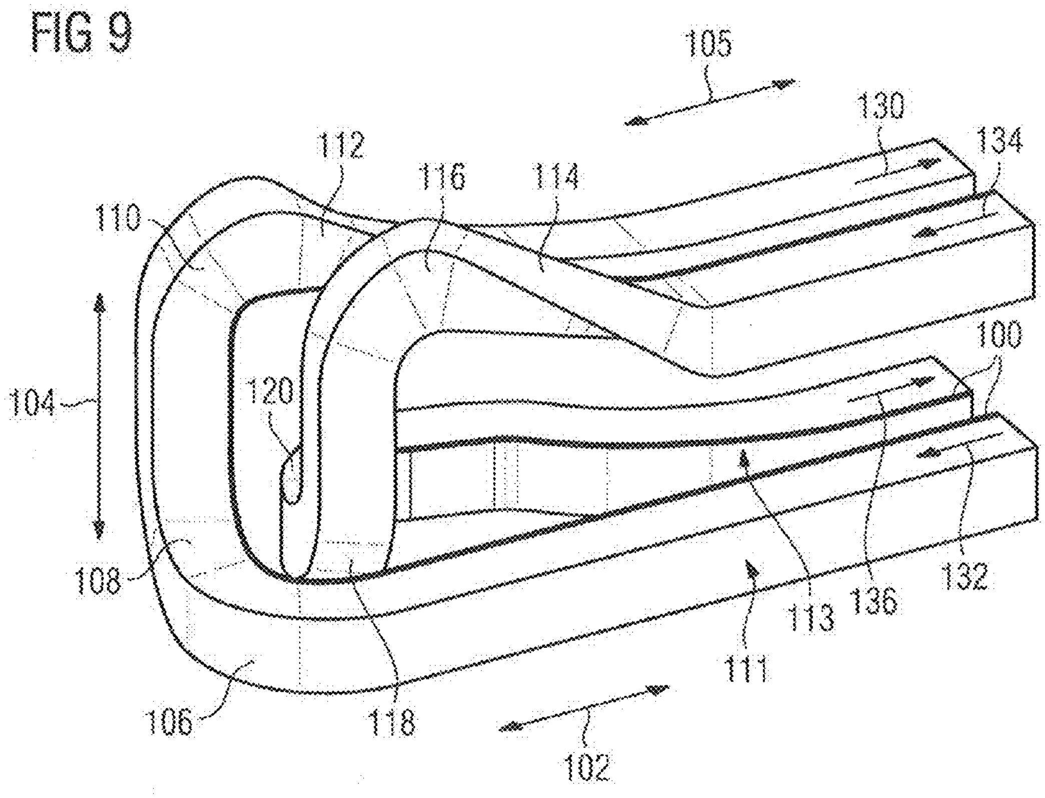

The joining section 5*c* is embodied in an exemplary embodiment in the form of a vertical transition. This transition can be a space curve in an exemplary embodiment, on which the pockets 6 of the intermediate store 5 move, in order to move between the upper part 5*a* and the lower part 5*b*. An exemplary embodiment of a space curve is shown in FIG. 9 and explained in greater detail.

It goes without saying that in another exemplary embodiment the output conveyor devices 7 can also be arranged alongside one another. The intermediate store 5 in this case also has parts which in each case extend over a part of an output conveyor device 7. The parts of the intermediate store 5 are likewise connected to each other by a joining section in this embodiment.

Regardless of the way in which the output conveyor devices 7 are arranged, i.e. alongside each other or one above the other, the exemplary embodiment generally allows an increased throughput. The exemplary embodiment also enables the speed of the output conveyor devices 7 to be reduced however, for example in proportion to the number of output conveyor devices 7. The throughput of each output conveyor device 7 can thus be adapted to the maximum throughput of a subsequent packaging or piling device, for example by means of a combination of increased throughput and speed reduction.

In this exemplary embodiment too there is an area of the intermediate store 5 which does not overlap with the output conveyor device below it.

For intermediate store-based sorter systems with mobile sorter pockets as part of the output conveyor device the performance can be increased by using a number of output conveyor devices. One aspect of the present application relates to a reduced-length transition of the intermediate store from one level to another necessary for this purpose. In this way two output conveyor devices can be arranged one above the other instead of next to each other, which results in a reduced footprint.

The capability of the sorting system which can be achieved depends on the degree of overlap between the intermediate store and the output conveyor device. The degree of overlap is reduced by the length of the rerouting, from which its importance for the capability of the system is derived.

The possible use of a helical line results in a longer path length depending on the deflection point of the means of pulling on the support element (e.g. pocket). It is also more difficult to manufacture.

The proposed reduced-length transition consists of a series of three flat curves, typically at 90°, and a subsequent rotation of the support elements. In an exemplary embodiment the support elements are pockets. The incoming and outgoing path course are parallel in this case. The first flat curve is around a vertical axis, followed by a flat curve around a horizontal axis. The subsequent vertical movement of the pockets is used for adapting the course of the path to the height to be surmounted. This is followed by a flat curve around a horizontal axis which is perpendicular to the first curve. The transition is completed by a rotation of the pocket by 90° around its direction of movement.

There is only a slight relative displacement between the item in the pocket and the pocket walls, if the item has already been stored in the pocket close to the inside of the pocket. Otherwise the item is aligned in relation to the inner side wall. A change of the side wall in the interim in relation to which the item wants to align does not occur during the entire transition.

The measures described for the level transition, consisting of a series of flat curves and a final rotation of the pocket, makes the following advantages possible:

Reduced length by comparison with a helical line enables a higher system throughput The orientation of the items on the inside of the pockets is system-immanent.

the compact rerouting is combined advantageously with the use of a buffer store with two loading stations of the intermediate store after around half its circulation time (“1+1” loading mode).

More simple embodiment possible.

The vertical transition of the intermediate store is shown in more detail in FIG. 9. The black line 100 designates the locations of the hinge point of the pockets on the pulling means. The position of these hinge points allows minimum hinge radii for the pocket network and therefore a minimized length for the level transition. FIG. 9 also shows the two path guides 111 and 113 in the lower horizontal level 102. The position of a second level parallel to level 102 is determined by the arrow 104. The transition of each pocket conveyor path from one level to another occurs through a sequence of 90° curves. The pockets are attached in the area of the line 100 to the pulling means in relation to which the movement of the pockets will be described. Along the line 111 in the direction of the arrow 132 the pockets initially execute a 90°curve in the level 102 as shown by arrow 106. Subsequently a further 90° curve is executed, with the pockets being rerouted from the first level 102 into the parallel second level, represented by the arrow 108. The pocket then moves vertically until shortly before reaching the second horizontal level, which it reaches after a further, third 90° rerouting 110. Finally there is a first 90° rotation 112 round the direction of movement 130, in which they then continue. The second path routing 113 is undertaken in an equivalent manner in the opposite direction.

The start direction for subsequent explanation is to be the arrow 134. Initially the pockets undergo a second 90° rotation 114 around their direction of movement, which is followed by a sixth 90° curve 116 around a horizontal axis in the level parallel to level 102. The pockets then overcome the difference in height between the two horizontal levels along the level 104 and come in the horizontal level 102 through a seventh 90° curve 118. This is followed by an eighth 90° curve 120, after which the pockets continue in direction 136. Establishing the same distance of the two path routings from each other as in the upper level can be achieved by a subsequent combination of a flat right and a left curve. In accordance with this arrangement the following advantages are produced.

Figure 10:
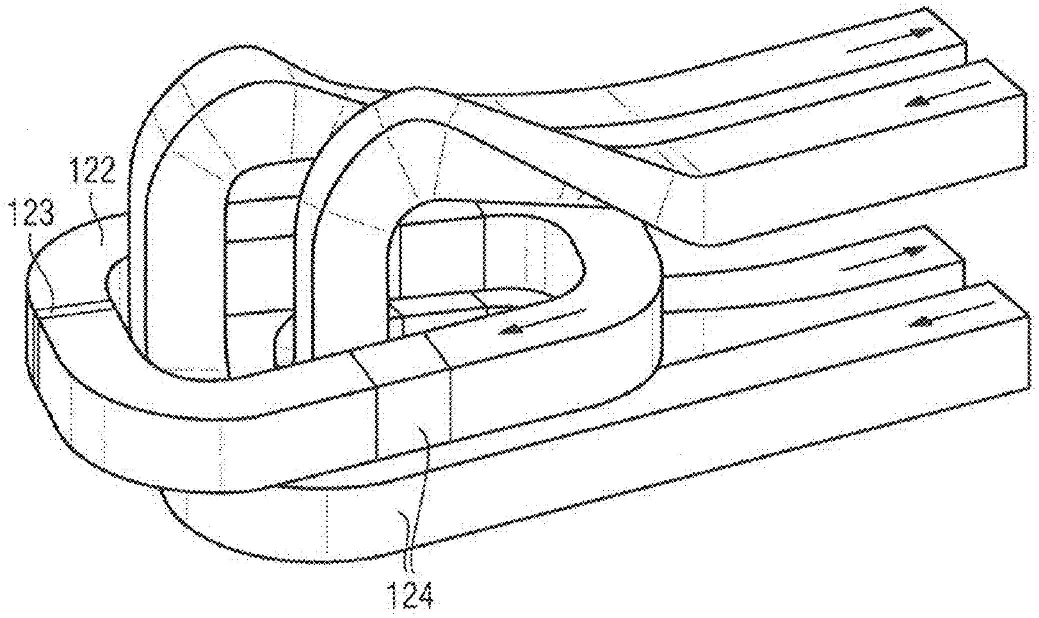

The arrangement described also advantageously allows the use of a ring-type buffer store 122, see FIG. 10. This is loaded at point 123 and outputs the items at two points 124 into the intermediate store. In this case the pockets need approximately half their overall circulation time between these two points.

Figure 11A:
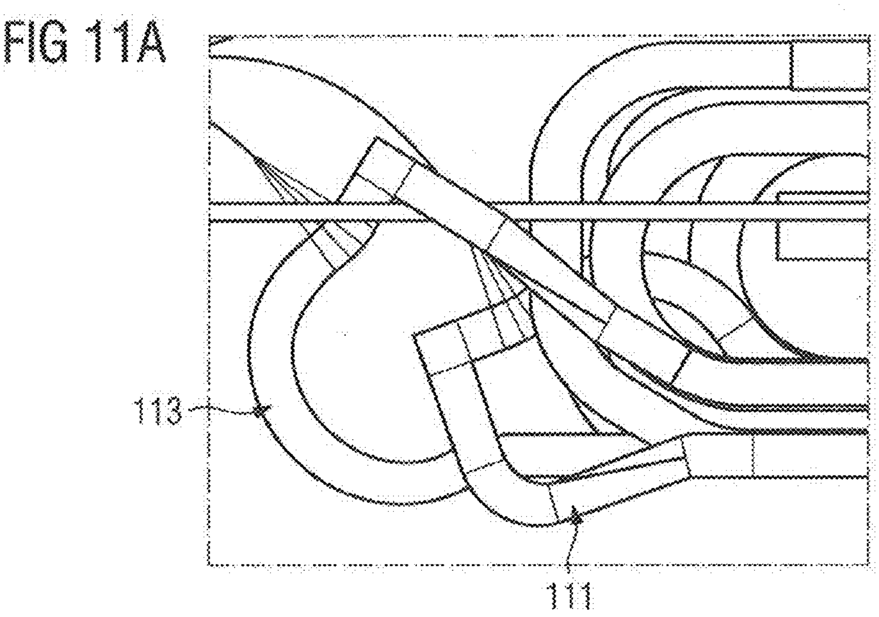
Figure 11B:
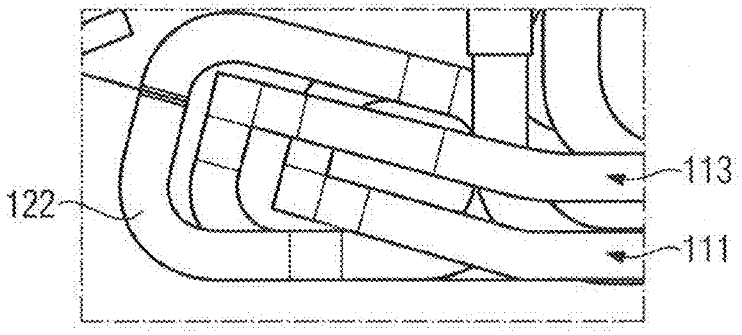
Figure 11C:
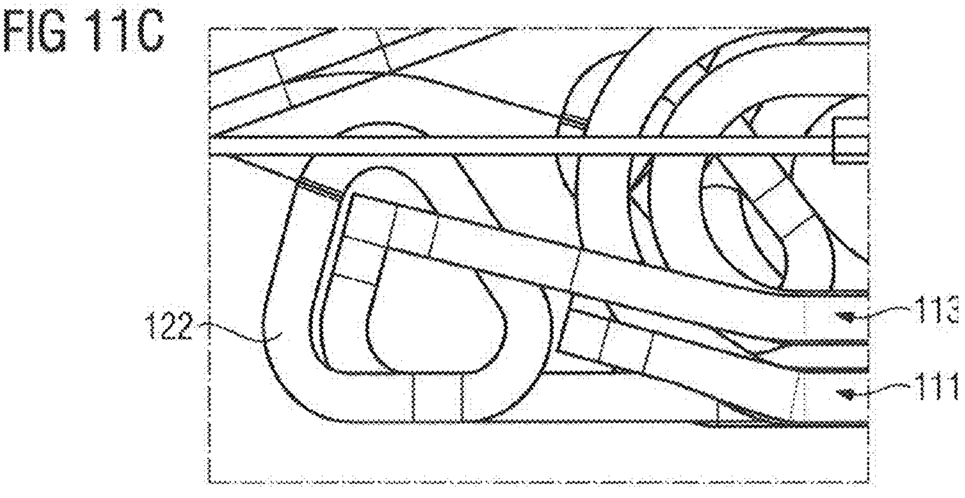

FIG. 11*a*-11*c* show the overhead view of different exemplary embodiments. Whereas FIG. 11*a* does not contain any buffer storage, FIG. 11*b* features one buffer store and FIG. 11*c* two buffer stores. In both cases two transfer points from the buffer store into the intermediate store are realized for generating a "1+1" loading mode. Common to all these figures is the same numbering of the elements.

Figure 4:
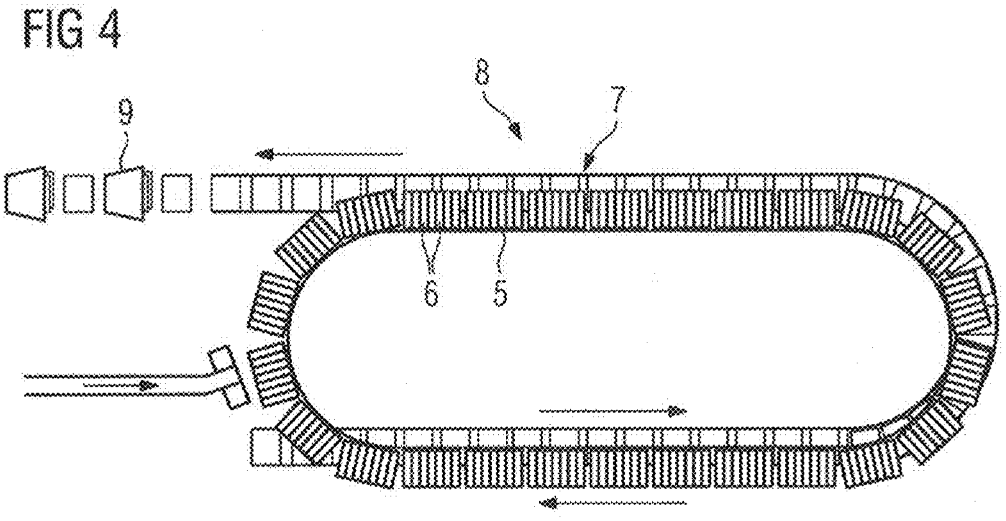
Figure 12A:
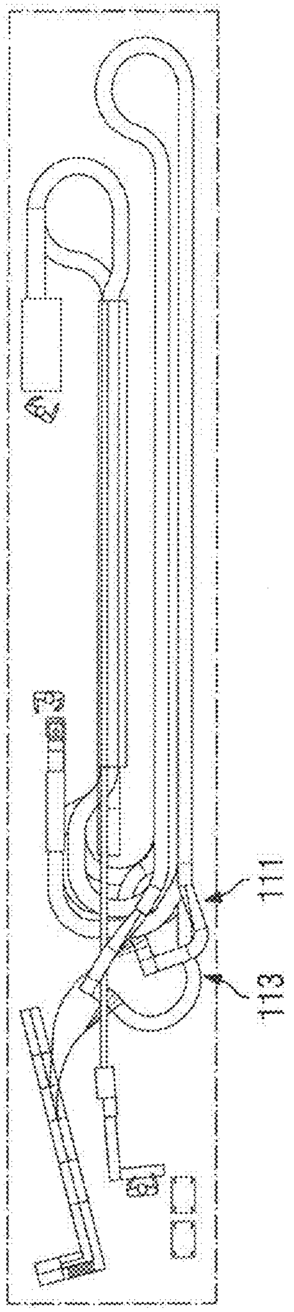
Figure 12B:
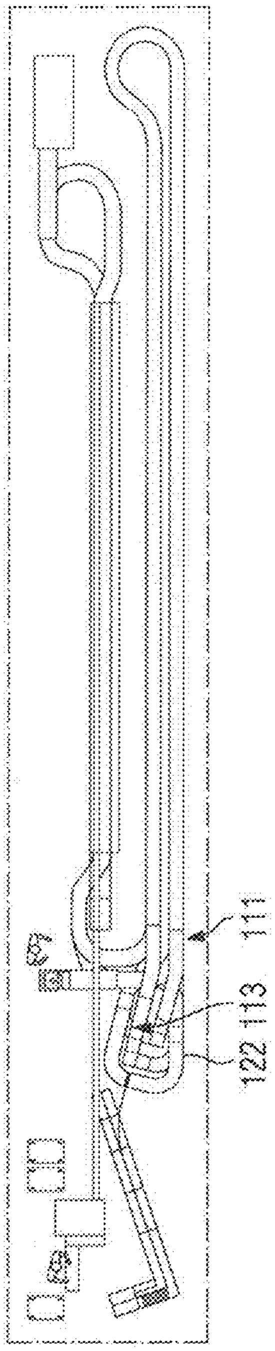
Figure 12C:
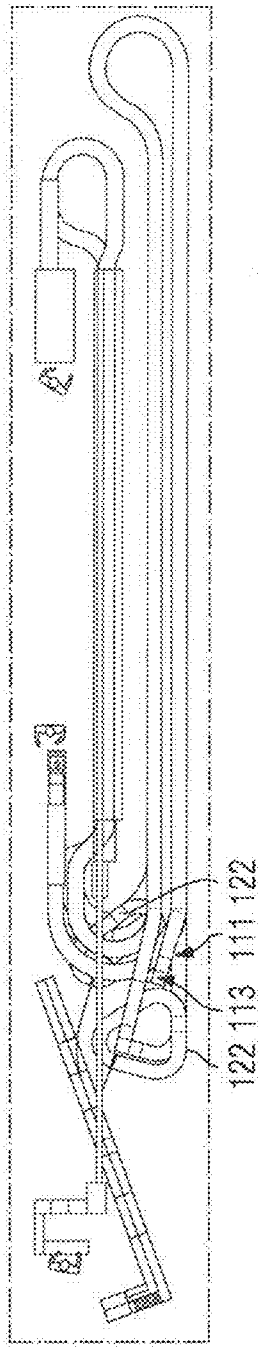

FIG. 12*a*-FIG. 4 12*c* show the implementation of the arrangements of a sorting system shown in FIG. 10. The scalability of the system lies within the framework of usual constructional measures and does not restrict the area of protection.

FIG. 13*a*-13*f* illustrate a further aspect of the system shown in FIG. 1. Intermediate store-based machines are less well suited for the processing of letters, since by comparison with a pinch belt system the items are transported through an intermediate store with markedly reduced throughput. Because of this a separate process unit is proposed for letters, which has two objects to achieve. One object is the sorting of the letters of a delivery point into a sorting bin as the last subprocess of the delivery route sorting process. The second object consists of outputting this volume of letters for each delivery point to the output conveyor system. This exemplary embodiment thus relates to these two objects.

Previously no intermediate store-based sorting system has been known for flats which sorts letters in a separate subsystem.

The output conveyor devices 7 not only serve to combine the postal items from the intermediate store 5 but also to combine them with letters. To this end sorting pockets for letters are arranged above the intermediate store 5 and this is done so that an output conveyor device 7 moves along below the sorting pockets. Each sorting compartment is assigned a delivery point in this case.

A loading device fills the sorting pockets for letters independently and separately from the intermediate store 5. The number of sorting pockets is selected in this case so that the second or last pass of a multi-stage sorting process can be transferred to the device shown in FIG. 13*a*-13*f*.

After all letters for the sorting pockets are transferred to these, the sorting pockets are emptied by their contents being transferred to the output conveyor device 7 moving underneath them.

FIG. 13*a*-13*f* show a schematic DPP system with two vertically arranged output conveyor devices. This DPP system is based as described above on an intermediate store 5. In the embodiment shown the DPP system has a group of sorting pockets at each of the two levels. An output conveyor device is located below the sorting pockets in each case.

The described method of a correspondingly adapted subsystem for processing of letters offers advantages such as achieving a high performance since the processing device for flats is bypassed for letter processing.

FIG. 13*a*-13*f* illustrate a further aspects of the system shown in FIG. 1. To this end the subsystem described previously is designed such that it achieves two objects, namely filling separate sorting pockets for letters as part of a sorting process, where the postal items for one delivery point are allocated to a sorting bin, and the pile per sorting bin is transferred to an output conveyor device. In an exemplary embodiment a broad group of sorting bins is used for this purpose. If two levels are present, each level is assigned a second group of sorting bins. To make possible continuous operation, the groups is filled and unloaded alternately, i.e. while one group of sorting bins is filled the associated alternate group of sorting bins is emptied by the letters being transferred to the output conveyor device.

Two groups of sorting bins are thus used in the exemplary embodiment shown. In FIG. 13*a*-13*f* these groups are labeled Bin Set 1 and Bin Set 2. In these figures the timing sequence of the transfer onto the output conveyor device 7 (i.e. the emptying of the sorting bins) and the filling of the sorting bins is illustrated as an example for one level. Above the sorting bins illustrated lines for the respective status of a set are shown in FIG. 13*b*-13*f*, with the status of the first set (status Bin Set 1) being shown above the status of the second set (status Bin Set 2).

FIG. 13*a*-13*f* in this case each show two alternately arranged sets of sorting bins, which are referred to here for descriptive purposes as red (R) and blue (B). Each set of sorting bins here contains 30 sorting bins, labeled as R1-R30 or B1-B30 respectively. For clarification the sets are arranged above the output conveyor device 7, which moves from left to right. The arrangement of the letter containers should in this case occurs in the direction of the letter transport in decreasing order (here decreasing from the left (R30, B30) to the right (R1, B1)). Higher numbers of sorting bins are assigned in this case higher delivery point numbers of the groups of 30 delivery points.

Figure 13A:
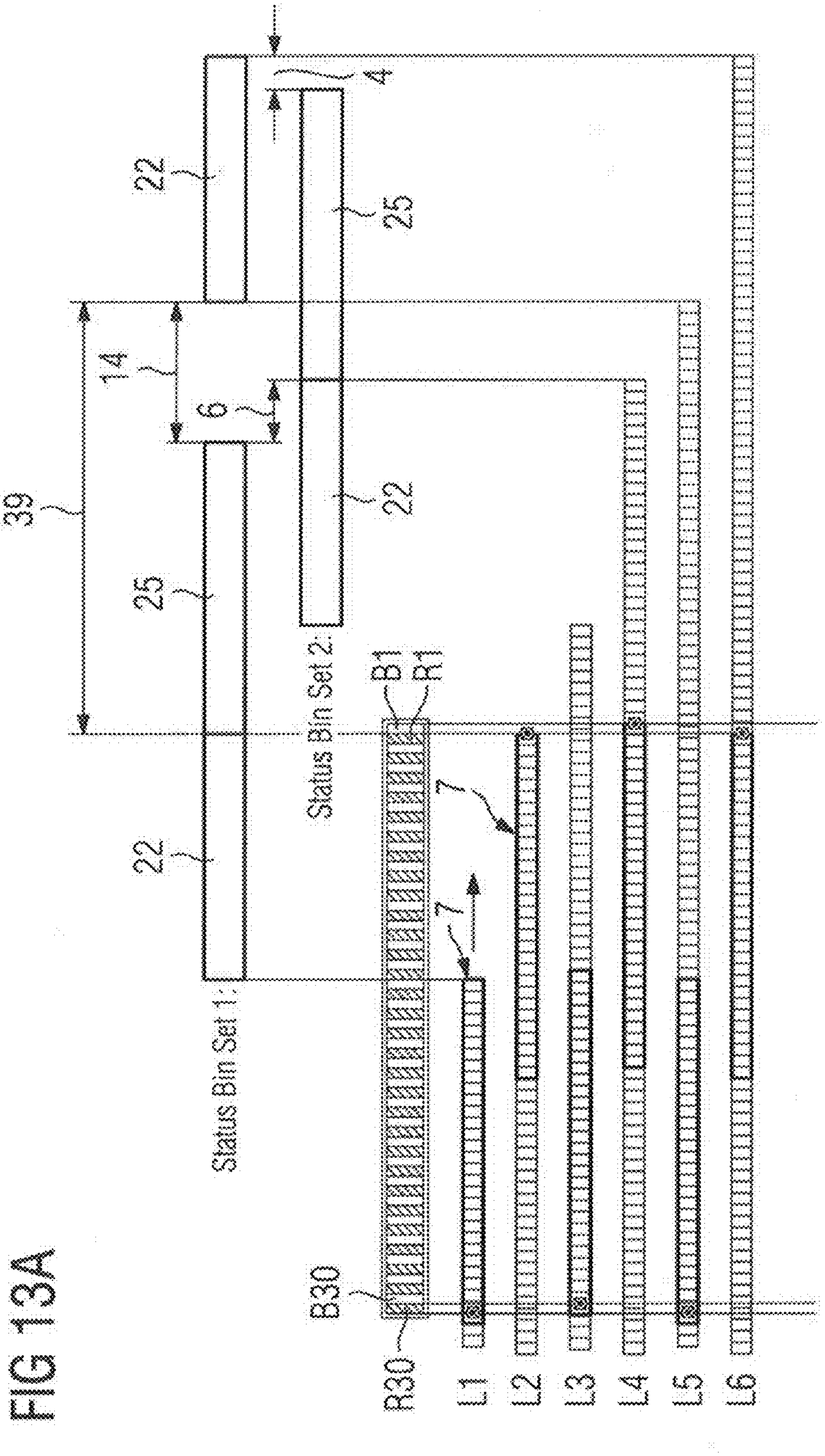
Figure 13B:
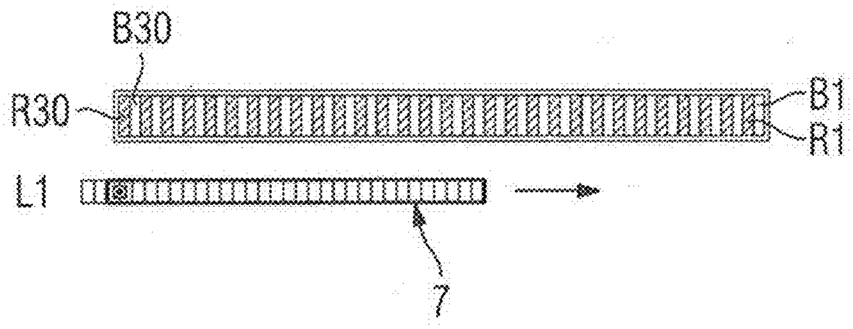
Figure 13C:
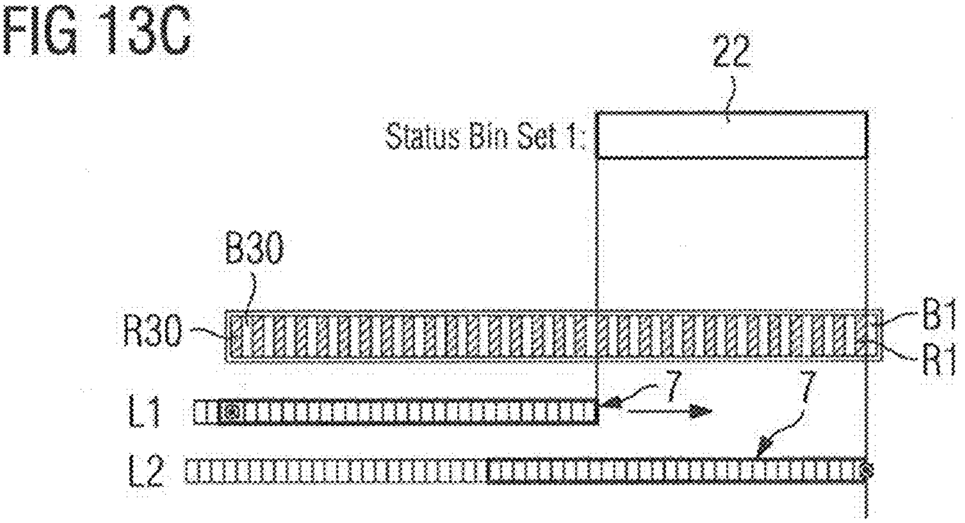

FIG. 13*a* illustrates in line L1 below the output conveyor device 7 its position in which the contents of the sorting bin R30 are transferred onto the output conveyor device 7. In FIG. 13*b*, line L2, the output conveyor device 7 has moved to the right and has in doing so been loaded with the contents of sorting bins R1-R29 so that the contents of 30 sorting bins R1-R30 is located on the output conveyor device 7. The first set is thus for a time of for example 22 secs in the transfer status. When the transfer begins, all postal items which are allocated to this group of delivery points must have already been sorted into the sorting bins. According to FIG. 13*c* the first set is then in the loading status, for example for 25 secs.

Figure 13D:
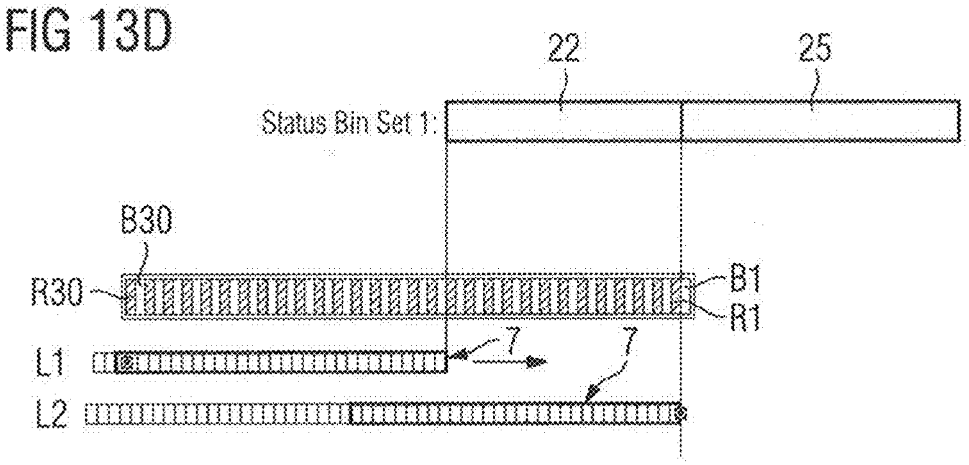
Figure 13E:
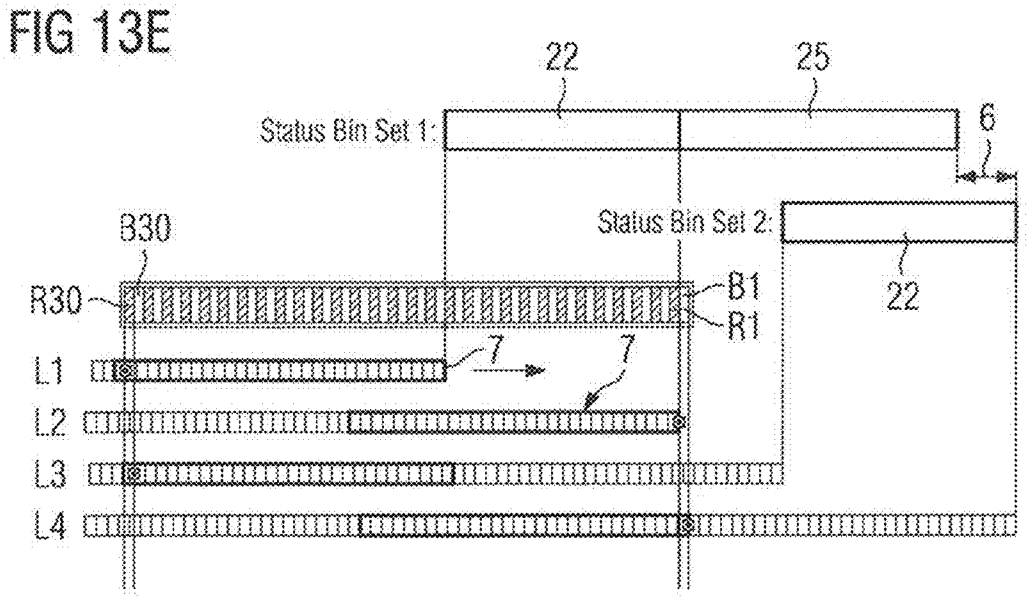

FIG. 13*d* shows in line L3 that for around. 9 secs, after all red sorting bins R1-R30 have been emptied, the process of transferring the blue sorting bins B1-B30 to the output conveyor device 7 begins. The blue containers are thus in the transfer state, until all blue sorting bins B1-B30 are emptied (line L4). In accordance with FIG. 13*e* the second set is then in the loading state for 25 secs for example.

Figure 13F:
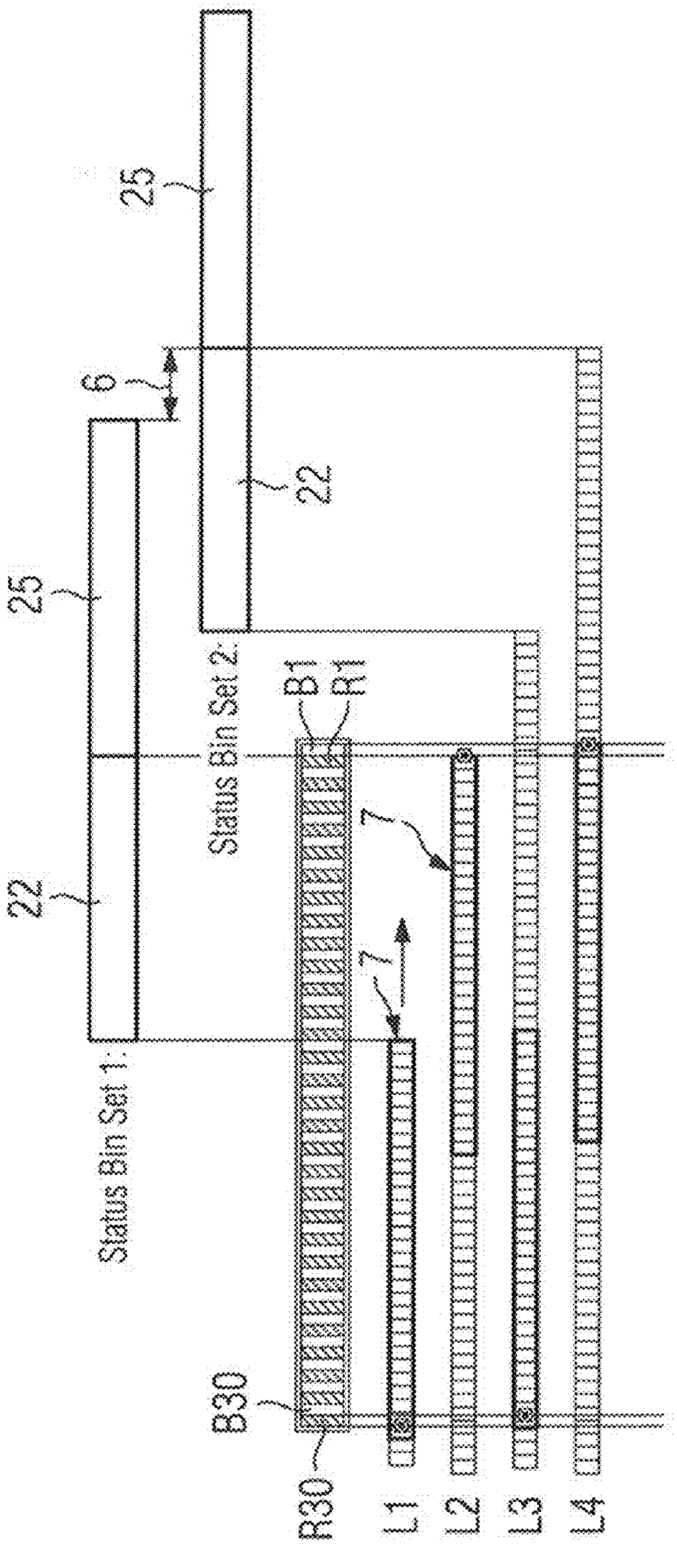
Figure 13G:
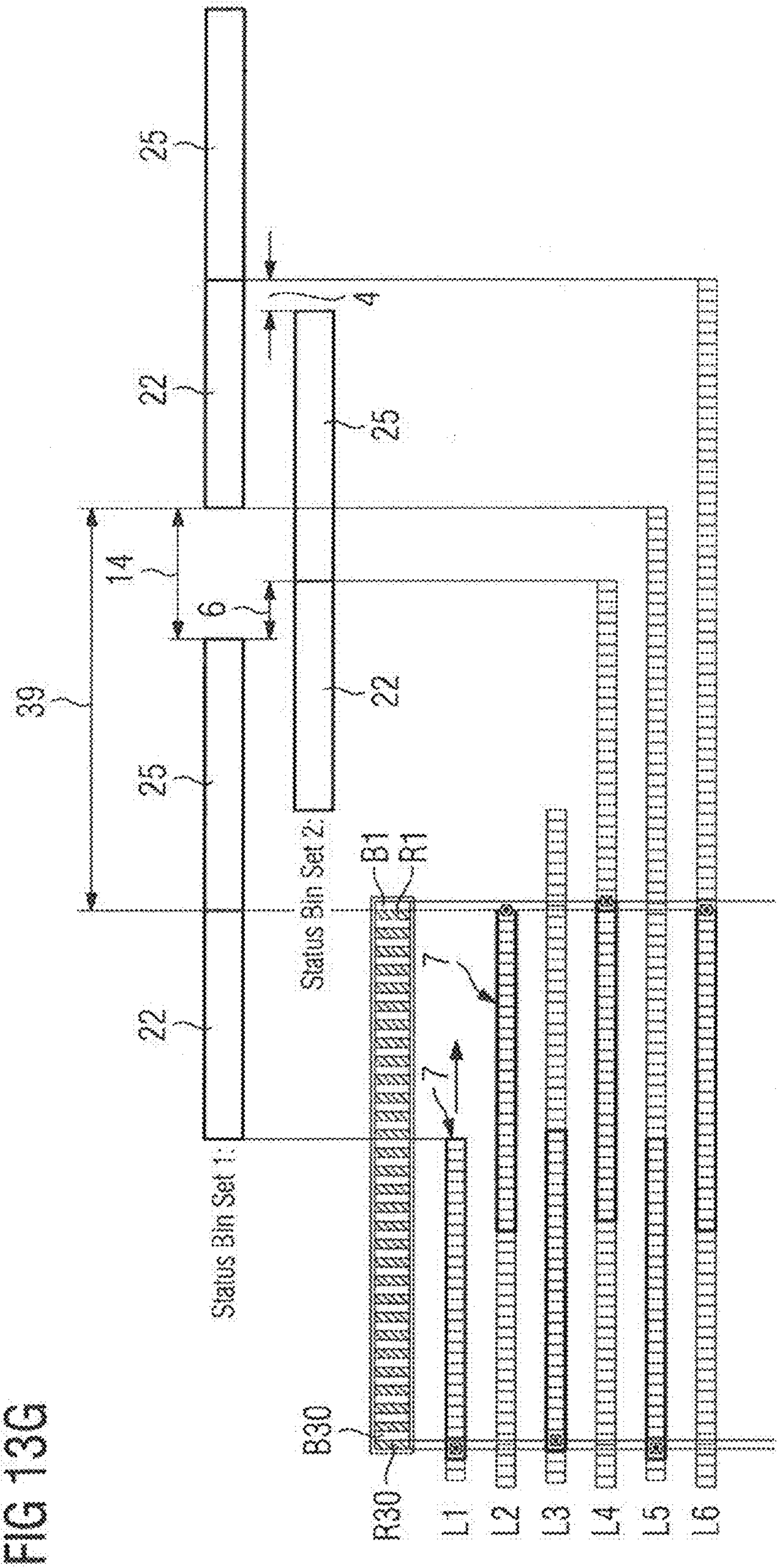

FIG. 13*f*-13*g* illustrate in lines L5, L6 that the transfer processes of the two sets shown in FIG. 13*a*-13*e* are repeated. In one exemplary embodiment the period between two transfers amounts to 39 secs for a set. FIGS. 13*f* and 13*g* also illustrate that in the exemplary embodiment shown a pause can occur in the separation module for letters, for example if the first set has been loaded, the pause until the beginning of loading the second set is a few seconds, e.g. around 4-6 secs. This separation interval does not however reduce the throughput of the system, since this is determined by the output conveyor devices.

The previously described method ensures a maximum period for refilling, i.e. with the given throughput of the output conveyor device a maximum pause of the separation module. This can be kept as a safety margin to enable above-average volumes of postal items to be processed per set. The exemplary embodiment described is based on the use of only two sets of sorting bins, which are alternately filled and emptied.

Figure 14:
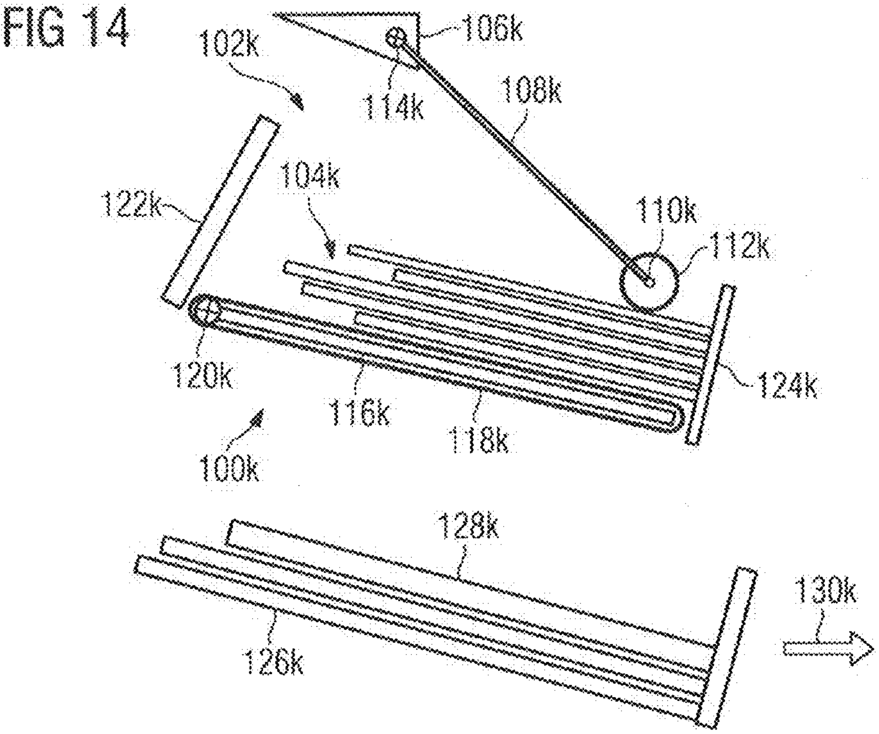
Figure 15:
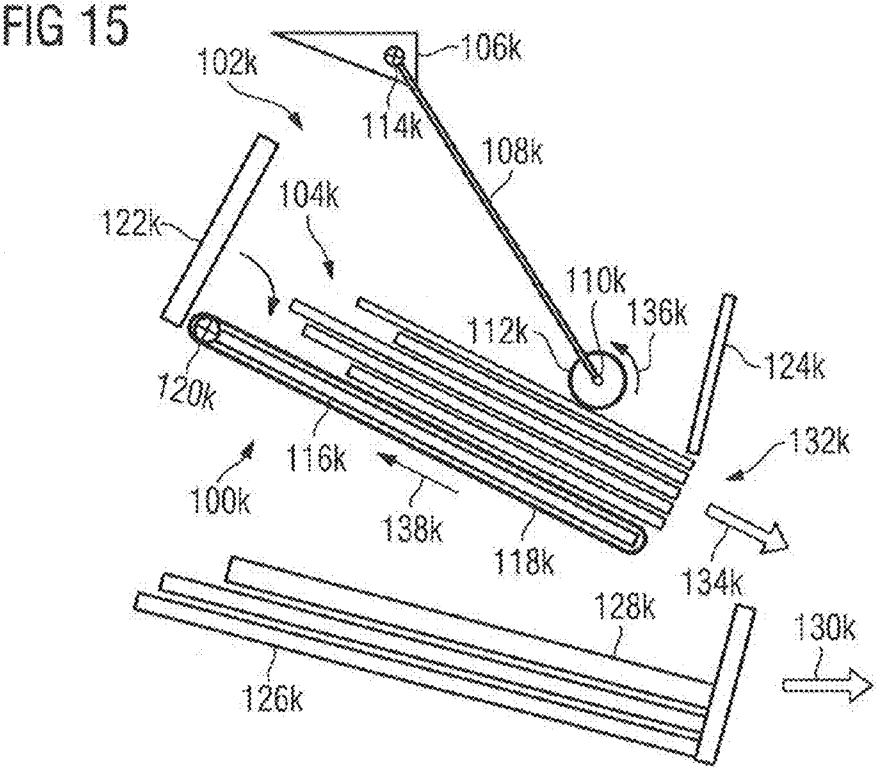

FIG. 14-15 illustrate a further aspect of system shown in FIG. 1.

The sorting bin shown includes the following features for the additional transfer to the output conveyor device. The device consists of a bin floor which can swing downwards and the sorting compartment then opens. This floor can in be driven at its pivot point by a drag lever arranged on the top of the bin and is able to be reset via a spring force. The bin floor is provided with a driven underfloor belt for active acceleration of the letter pile, supported by the gravitational force. In addition a driven roller located on the dragging lever on the top of the pile can support the acceleration of the pile. To ensure an alignment of the edge of the pile the piling compartment can be correspondingly inclined. An edge alignment can be obtained via an additional inclination of the piling bin. The proposed solution makes possible an automatic transfer of a pile of letters to a output conveyor device located underneath the piling bin. The cinematic circumstances mean that advantageously a larger angle of the piling bin floor is produced during the pile transfer than during the piling process into the piling bin.

The proposed piling bin is described in greater detail by FIG. 14 and FIG. 15. As shown in FIG. 14 the stream of letters 102 removed from the main stream, represented by the arrow 102, ends in the piling bin 100. A dragging lever 108 with a driven roller 110 rotates around the pivot point 114 as part of the letter deflector 106 corresponding to the occupancy level in the piling bin and the angle of the bin floor. The roller 110 located on the dragging lever is provided with a frictional running surface in relation to the letters so that in the driven case the letters are accelerated. The roller drive 110 as well as the driven rotation of the dragging lever are known to the person skilled in the art.

The piling includes a floor 116 with an underfloor belt 118, which is driven by one or both deflection rollers. The design is the choice of the manufacturer. The axis of the one deflection roller serves in this case also as the pivot 120 of the floor 116 around which the latter can be pivoted upwards or downwards. The sorting bin 100 also consists of a front wall 124 and a rear wall 122 between which the floor is arranged. All three walls thus form the sorting bin for accommodating letters.

Below the sorting bin is a conveyor device which in the exemplary embodiment can consist of individual tablets 126 with a flats and unaddressed postal items already located on them. The conveyor device moves from left to right in accordance with the arrow 130 shown in the drawing. The sorting bin 100 is stationary, it is not moved. The number of bins depends on the construction selected. The task of the device described above is to output letters 104 from the sorting bin 100 onto the conveyor device 126 on which there can already be flats and further postal items 128 for this delivery point.

The process of merging can be seen in FIG. 15. The sorting bin floor 116 is hinged around its pivot point 120 downwards so that a gap 132 is formed between it and the front wall 124. The underfloor belt 118 as well as the roller 110 are then driven in the same direction so that the letters are deposited through the gap 132 onto the postal items 128 of the conveyor device passing underneath the sorting bin. As can be seen from FIG. 15 the roller 110 turns in a counterclockwise direction 136 for this purpose whereas the underfloor bell 118 rotates in a clockwise direction 138. The simultaneous movement of the roller 110 and underfloor belt 118 accelerates the letters 104 out of the sorting bin 100 through the gap in accordance with the arrow 134. The activation system necessary for this is known to the person skilled in the art.

For intermediate store-based sorting systems the basic problem which exists is that the number of postal items to be sorted into route order can exceed the number of usable storage units. This critical omission situation for any delivery route sorting can be resolved in accordance with invention 2005/025763 A1 by creation of sufficiently small batches with contiguous ranges of delivery points. It is characteristic for this process that an initial a separate volume of postal items which must be processed in one or more separate process steps is minimized.

A further form of application of the invention notification describes an arrangement which requires the reloading of an intermediate store with the separated volumes of postal items but does not require the items to be separated again. There is no arrangement or machine known in which the entire volume of postal items does not have to be processed again. In addition with this type of tree-sort method the knowledge of the volume distribution between the delivery points is necessary.

The proposed arrangement consists of two large mirrored machines in accordance with FIG. 1, which are offset sideways in relation to each other. Each of the two machines corresponds to the system from FIG. 1, expanded by a separation device and loading device of unaddressed postal items on to one or more output conveyor device before the overlapping area or intermediate store and output conveyor devices.

To minimize the total surface requirement of this double arrangement the path of buffer store, intermediate store and output conveyor devices is mirrored symmetrically around an axis but the circulation orientations in the clockwise direction are maintained.

Figure 16:
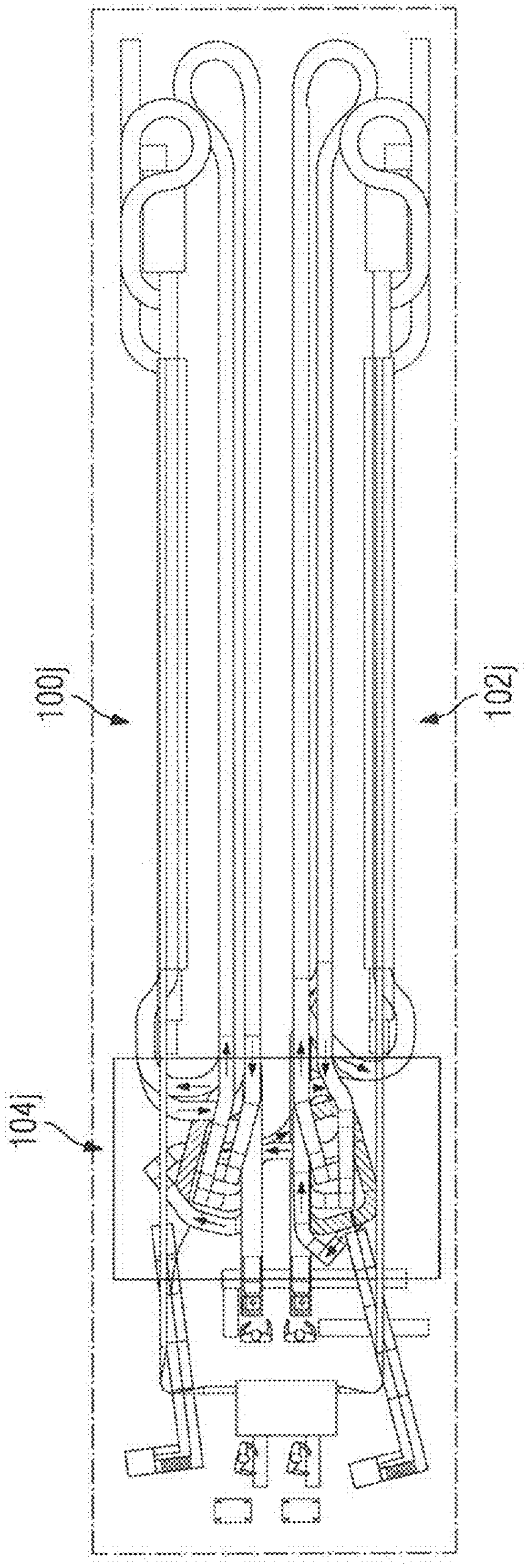
Figure 17:
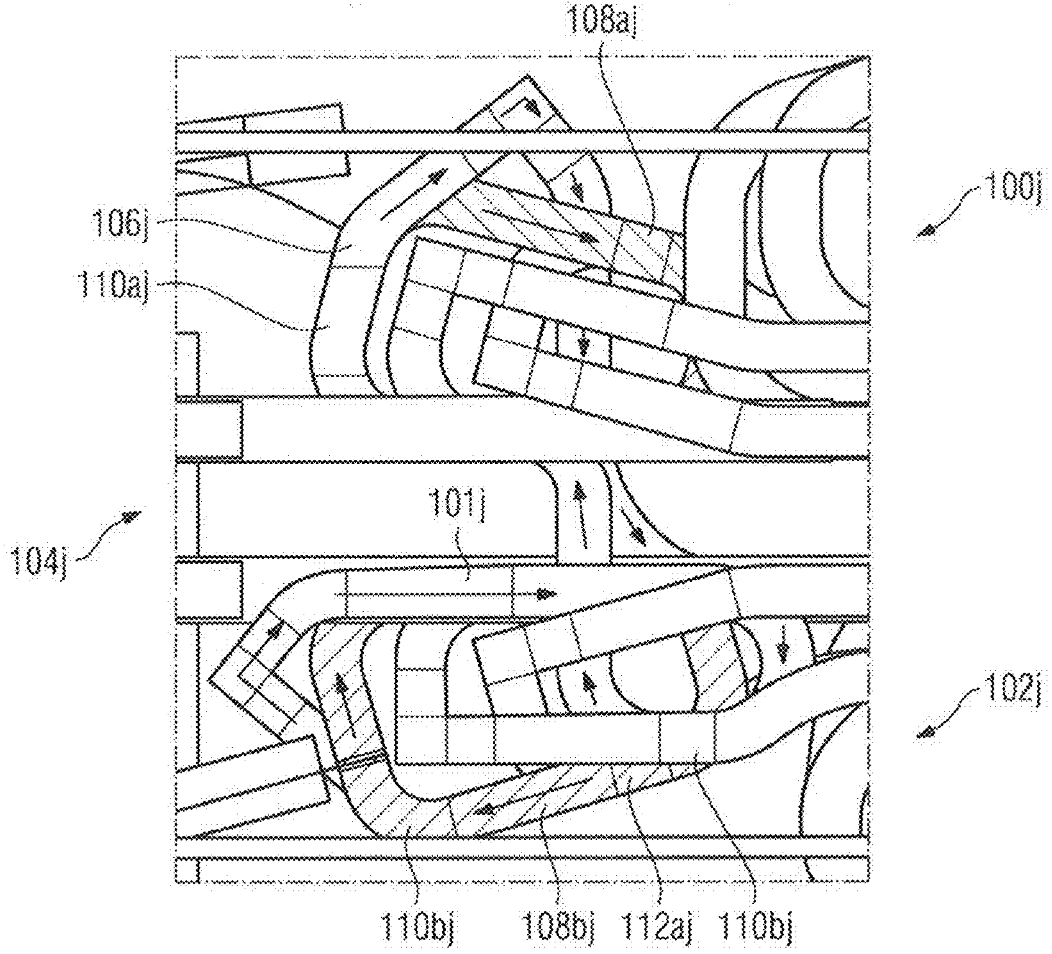

As shown in FIG. 16, the two machines 100 and 102 can be connected to one another via one or more conveyor devices in the area of the buffer store or the buffers stores 104, as shown in greater detail in FIG. 16. The self-contained connection conveyor device 106 logistically connects the machine 102 to the machine 100 in the area of the intermediate stores 108*a* and 108*b* of the two machines. In the non-cross-hatched areas the buffer store 108*a* passes below other conveyor devices. The connecting conveyor device is loaded in an area 110*b* from the buffer store and from a non-visible area lying below it from the intermediate store of machine 102 as well as in the area 110*b* from the buffer store of machine 102. The connecting conveyor device is unloaded into the intermediate store 108*a* of machine 100 in area 110*a*. The two loading areas from the intermediate store (110*b* and the second which cannot be seen) lie immediately before the two loading stations 112*a* and X (hidden) of the intermediate store of machine 102 through the buffer store 108*b*.

Thus the volume of postal items which is not contained in the batch size to be processed by the machine with contiguous range of delivery points, can be automatically loaded without an additional separation process into the buffer store 108*a* of another machine 100. This volume of postal items is then further processed on this machine 100.

The volume of letters associated with this further processing process is automatically diverted from the separation device for letters of machine 102 into the letter processing system of machine 100 using an appropriate crossing unit.

The volume of unaddressed postal items associated with this further processing process is no longer separated by the corresponding device of machine 102, but by that of machine 100. For these reasons the two devices are arranged alongside each other.

The described the arrangement consisting of two logistically coupled machines has the following characteristics:

- Largely mirrored routing in the two machines enables a minimized footprint with unchanged subsystems.
- Separation and loading devices arranged alongside each other for unaddressed postal items allow better utilization by the operators.
- One or more logistical connection devices between the machines makes it possible to also process batch sizes which are larger than the storage capacity of the intermediate store without an additional processing process.
- The preferred connection of machine 102 to 100 takes the postal items out of the intermediate store of machine 102 in each case shortly before the loading areas of the intermediate store as well as from the buffer store of machine 102 shortly before the loading area of the buffer store and outputs them into the buffer store of machine 100 shortly before the loading area of the buffer store again.
- The most favorable embodiment of connecting conveyor device also makes possible a functionally comparable logistical chaining additionally of machine 100 after machine 102.
- The necessary networking of the two letter separation modules with the two letter sorting subsystems of the two machines also lets a letter sorting system be produced with double the number of available letter sorting bins with simultaneous doubling of the throughput by comparison with an individual machine. This is of great significance for previous upstream sorting processes, for example the first sorting pass within a delivery route sorting process.

Figure 18:
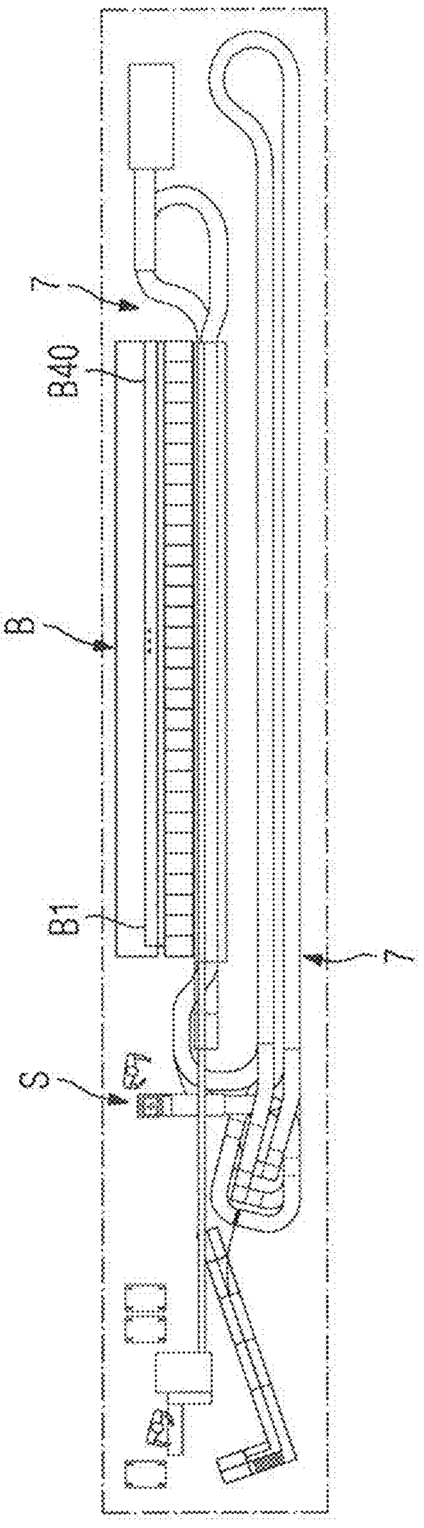

FIG. 18 shows a schematic diagram of an exemplary embodiment of a device for ordering unaddressed postal items. The device shown has a station in which the unaddressed postal items are generally directed as a pile manually or are directed by a loading device to the individual conveyor elements of the output conveyor device 7. In a specific section of the output conveyor device 7 a number of output points are arranged along the latter into which the unaddressed postal items will be transferred. In an a exemplary embodiment 40 output points can be present. If each mailperson is allocated an output, the postal items can be pre-sorted for 40 mailpersons with this output conveyor device. The individual output points can each be connected via a further active or passive transport system (e.g. conveyor belt or slide) which is arranged at right angles to the output conveyor device 7 with corresponding containers for accommodating the pile or a range, by this pile being appropriately prepared and packaged for an automatic separation.

Depending on the type of the output conveyor device 7 the items are transferred into the output point either almost vertically or almost horizontally. Depending on the embodiment the transfer can be undertaken ballistically. The unaddressed pile of postal items on the output conveyor device 7 can be transferred horizontally via a control mechanism controlled by a control device into the respective output point or they are transferred into a output point below the device. If the pile of postal items is located on individual tablets or trays, the control device turns a support towards this in each case so that the pile of postal items slips down from this against the direction of movement of the support if it is above the desired output point. At the end of the processing each type of promotional postal item is allocated to a mailperson, i.e. each mailperson is for example allocated a plurality of promotional postal items of a large customer A and a plurality of promotional postal items of a large customer B.

Figure 21:
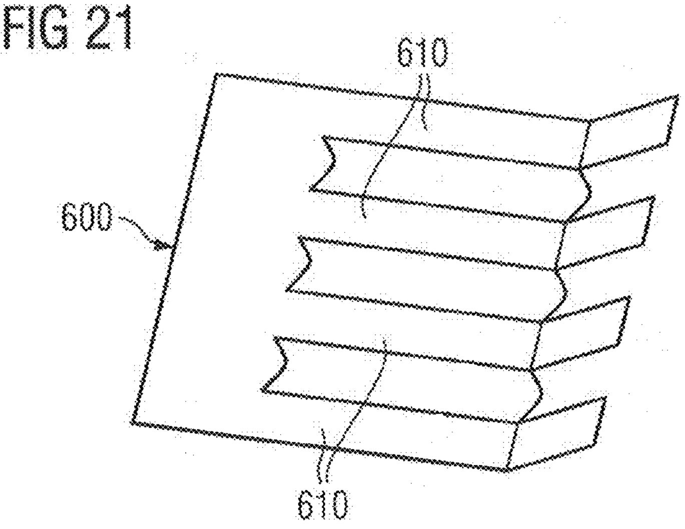
Figure 22:
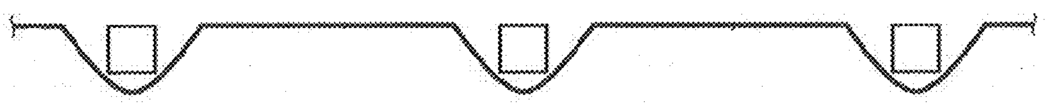

The function of processing unaddressed postal items shown in FIG. 21 can be employed in a device with one output (FIG. 2-FIG. 7) or with two outputs (FIG. 8). It goes without saying that in a structure with two outputs the ordering of the unaddressed postal items can be undertaken with a higher throughput or for more output points.

For unloading previously known tray conveyors for flat postal items the tray is tipped and the item falls through gravitation from the tray into a destination point.

The items to be sorted can be directed individually or as a pile to the tipping tray.

In the case of the OMP piles of postal items will be collected on a tray conveyor and then directed to an extraction unit.

The trays are inclined in the direction of conveyance so that an optimum batch image (orientation along the bound side of the postal items) is produced on ejection from a bin sorter.

Tipping trays are unsuitable for achieving a continuous emptying of the trays at a high-speed of conveyance without decisively reducing the pile quality for subsequent packaging processes. Trays which tip sideways will lead because of the undefined shaking process to considerable deterioration of the pile formation.

A solution for an active and defined removal of postal items from tipping trays is not known.

The above-mentioned problem is resolved by the following technical features:

- the transport trays are inclined in the direction of conveyance. This results in weight-controlled orientation onto the bound edge:
- the transport trays feature a stop edge (bound edge of the postal items) for defined orientation of the postal items
- the transport trays feature recesses or are embodied as forks;
- The carriage of the trays moves during unloading along a circular path curved downwards and by turning the trays, so that fork-shaped narrow transport belts can move under the postal item pile and continuously accept the postal item pile; and
- the accepting transport belts are embodied as sectional conveyors and guide the postal item pile to a packaging unit.

The major advantage of the present solution is the continuous, vibration-free and directed transfer of the postal items and postal item batch from a tray conveyor to another transport system at high speed.

Figure 19:
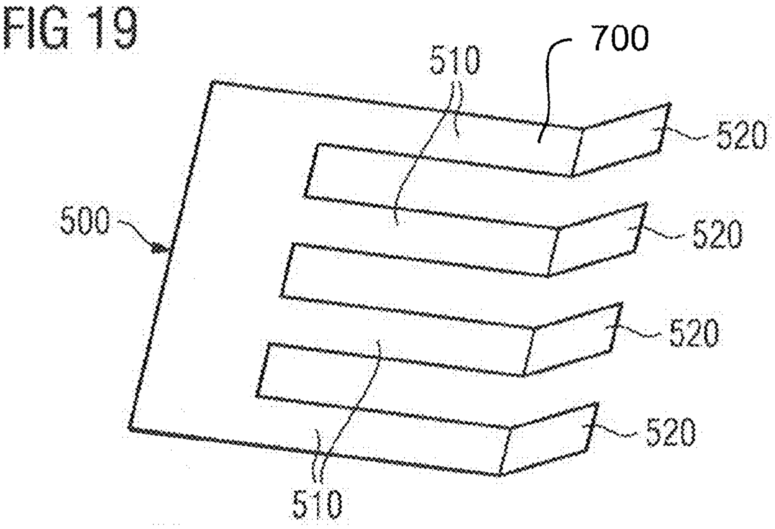
Figure 20:
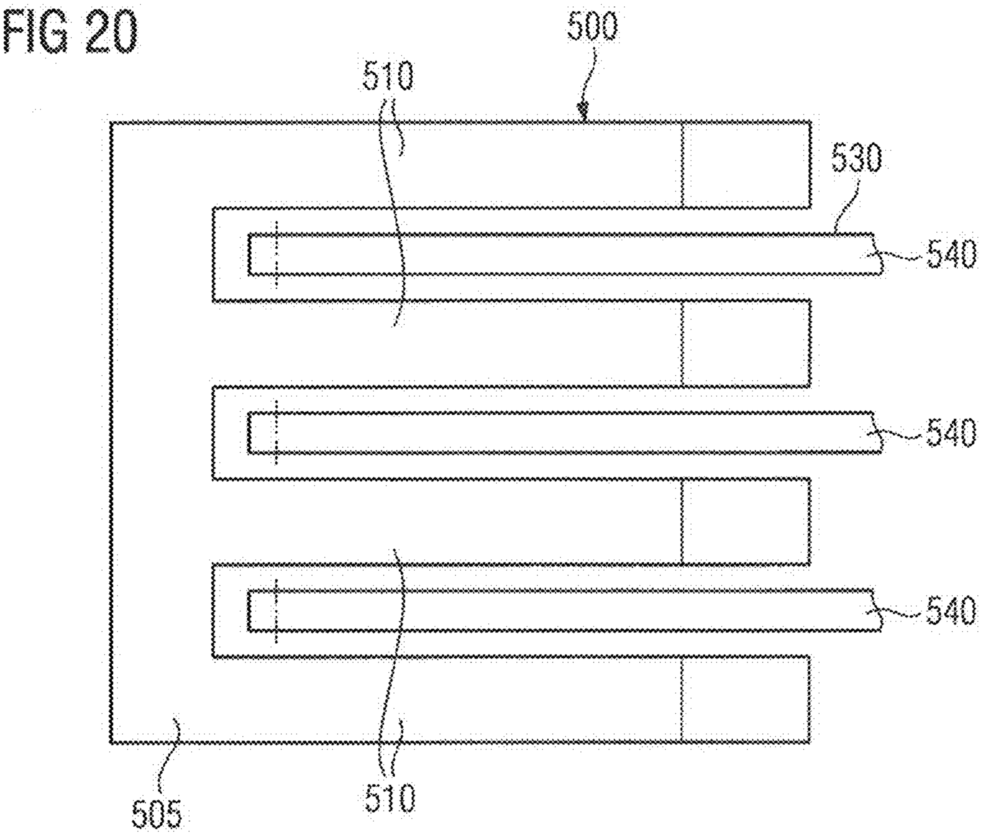

FIGS. 19-22 are used to show exemplary embodiments of support elements. FIG. 19 shows an exemplary embodiment of a support element 500 with a plurality of elements 510 spaced from each other so that a comb-structure or fork-structure is produced. The elements 510 comprise rear sections 700 and front sections 520 extending upwards with respect to the rear sections 700. FIG. 20 shows the support element 500 and a first transport device 530. The first transport device 530 comprises bands 540 spaced from each other. FIG. 20 shows that the support element 500 is aligned with the first transport device 530 such that the bands 540 of the first transport device 530 extend between the elements 510 of the support element 500. The floor 505 of the first transport device 530 is also shown. FIG. 21 shows a further exemplary embodiment of a support element 600 with a plurality of elements 610 spaced from each other so that a comb-structure or fork-structure is produced.

The exemplary embodiments described above can obviously be varied by a person skilled in the art in accordance with the actual conditions. If for example one separation device does not possess the required throughput, a number of separation devices 1 can feed the buffer pockets 3 in parallel.

The invention claimed is:

1. A method for transferring piled postal items from a support element to a first transport device, wherein the support element has elements spaced from each other producing a comb-structure or a fork-structure, wherein the elements have a rear section and a front section extending upwards with respect to the rear section, wherein the first transport device has a number of bands which are spaced from one another, and wherein the method comprises the steps of aligning the support element with the transport device so that at least a part of one of the bands extends between the elements.

2. The method according to claim 1, wherein said rear section and said front section are both flat; and said rear section and said front section are angled relative to each other.

3. The method according to claim 1, further comprising piling postal items to provide piled postal items for transport from the support element to the first transport device.

4. A device for transporting piled postal items, comprising:

a support element which has a plurality of elements, said elements being spaced from each other and producing a comb-structure or fork-structure, a first transport device which has a number of bands which are spaced from each other, wherein the elements have a rear section and a front section extending upwards with respect to the rear section, and wherein the support element and the transport device are aligned so that at least a part of one of the bands extends between the elements.

5. The device according to claim 4, wherein said rear section and said front section are both flat; and said rear section and said front section are angled relative to each other.

* * * * *